(12) United States Patent
Brewer

(10) Patent No.: US 11,074,078 B2
(45) Date of Patent: *Jul. 27, 2021

(54) ADJUSTMENT OF LOAD ACCESS SIZE BY A MULTI-THREADED, SELF-SCHEDULING PROCESSOR TO MANAGE NETWORK CONGESTION

(71) Applicant: Micron Technology, Inc., Boise, ID (US)

(72) Inventor: Tony M. Brewer, Plano, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/399,748

(22) Filed: Apr. 30, 2019

(65) Prior Publication Data

US 2019/0340027 A1    Nov. 7, 2019

Related U.S. Application Data

(60) Provisional application No. 62/667,760, filed on May 7, 2018.

(51) Int. Cl.
*G06F 9/38* (2018.01)
*G06F 9/30* (2018.01)

(52) U.S. Cl.
CPC ........ *G06F 9/3836* (2013.01); *G06F 9/30101* (2013.01)

(58) Field of Classification Search
CPC .. G06F 9/3851; G06F 9/30101; G06F 9/4881; G06F 9/3836
See application file for complete search history.

(56) References Cited

U.S. PATENT DOCUMENTS

| 5,742,822 A | 4/1998 | Motomura |
| 6,131,155 A | 10/2000 | Alexander et al. |

(Continued)

FOREIGN PATENT DOCUMENTS

| EP | 2441013 B1 | 8/2014 |
| EP | 2140347 B1 | 5/2017 |

(Continued)

OTHER PUBLICATIONS

Notification of Transmittal of the International Preliminary Report on Patentability from the International Preliminary Examining Authority for International Application No. PCT/US2019/030860, dated Aug. 28, 2020, pp. 1-18.

(Continued)

*Primary Examiner* — Jyoti Mehta
(74) *Attorney, Agent, or Firm* — Nancy R. Gamburd; Gamburd Law Group LLC

(57) ABSTRACT

Representative apparatus, method, and system embodiments are disclosed for a self-scheduling processor which also provides additional functionality. Representative embodiments include a self-scheduling processor, comprising: a processor core adapted to execute a received instruction; and a core control circuit adapted to automatically schedule an instruction for execution by the processor core in response to a received work descriptor data packet. In another embodiment, the core control circuit is also adapted to schedule a fiber create instruction for execution by the processor core, to reserve a predetermined amount of memory space in a thread control memory to store return arguments, and to generate one or more work descriptor data packets to another processor or hybrid threading fabric circuit for execution of a corresponding plurality of execution threads. Event processing, data path management, sys- (Continued)

tem calls, memory requests, and other new instructions are also disclosed.

22 Claims, 14 Drawing Sheets

(56) References Cited

U.S. PATENT DOCUMENTS

| | | | |
|---|---|---|---|
| 6,223,258 | B1 | 4/2001 | Palanca et al. |
| 6,973,650 | B1 | 12/2005 | Parkes et al. |
| 8,108,659 | B1* | 1/2012 | Le Grand ............... G06F 9/526 |
| | | | 712/225 |
| 2001/0005853 | A1 | 6/2001 | Parkes et al. |
| 2004/0034759 | A1 | 2/2004 | Katzman et al. |
| 2004/0078790 | A1 | 4/2004 | Wu et al. |
| 2005/0149932 | A1* | 7/2005 | Hasink ................... G06F 9/485 |
| | | | 718/100 |
| 2008/0155196 | A1 | 6/2008 | Black et al. |
| 2009/0049279 | A1 | 2/2009 | Steiss et al. |
| 2010/0122067 | A1 | 5/2010 | Lindholm et al. |
| 2010/0223598 | A1 | 9/2010 | Levine et al. |
| 2010/0274961 | A1* | 10/2010 | Golla ................... G06F 9/3855 |
| | | | 711/108 |
| 2011/0222553 | A1 | 9/2011 | Mital et al. |
| 2012/0079503 | A1* | 3/2012 | Dally ................... G06F 9/3851 |
| | | | 718/108 |
| 2012/0089812 | A1 | 4/2012 | Smith |
| 2012/0180072 | A1 | 7/2012 | Sander et al. |
| 2012/0230341 | A1 | 9/2012 | Mital et al. |
| 2012/0274961 | A1 | 11/2012 | Makabe |
| 2013/0339971 | A1 | 12/2013 | Boland et al. |
| 2018/0121375 | A1* | 5/2018 | Dodson ................. G06F 3/0685 |

FOREIGN PATENT DOCUMENTS

| | | |
|---|---|---|
| WO | WO1993002414 A2 | 2/1993 |
| WO | WO1997024671 A1 | 7/1997 |
| WO | WO2003102758 A1 | 12/2003 |

OTHER PUBLICATIONS

Written Opinion of the International Preliminary Examining Authority, for International Application No. PCT/US2019/030860, dated Apr. 8, 2020, pp. 1-14.
Notification of Transmittal of the International Search Report and Written Opinion of the International Searching Authority, or the Declaration for International Application No. PCT/US2019/030860, dated Aug. 21, 2019, pp. 1-23.
Notification of Transmittal of the International Preliminary Report on Patentability from the International Preliminary Examining Authority for International Application No. PCT/US2019/030865, dated Aug. 5, 2020, pp. 1-15.
Written Opinion of the International Preliminary Examining Authority, for International Application No. PCT/US2019/030865, dated Apr. 22, 2020, pp. 1-14.
Notification of Transmittal of the International Search Report and Written Opinion of the International Searching Authority, or the Declaration for International Application No. PCT/US2019/030865, dated Aug. 21, 2019, pp. 1-22.
Notification of Transmittal of the International Preliminary Report on Patentability from the International Preliminary Examining Authority for International Application No. PCT/US2019/030870, dated Aug. 28, 2020, pp. 1-18.
Written Opinion of the International Preliminary Examining Authority, for International Application No. PCT/US2019/030870, dated Apr. 8, 2020, pp. 1-13.
Notification of Transmittal of the International Search Report and Written Opinion of the International Searching Authority, or the Declaration for International Application No. PCT/US2019/030870, dated Aug. 21, 2019, pp. 1-21.

Notification of Transmittal of the International Preliminary Report on Patentability from the International Preliminary Examining Authority for International Application No. PCT/US2019/030875, dated Aug. 28, 2020, pp. 1-18.
Written Opinion of the International Preliminary Examining Authority, for International Application No. PCT/US2019/030875, dated Apr. 8, 2020, pp. 1-13.
Notification of Transmittal of the International Search Report and Written Opinion of the International Searching Authority, or the Declaration for International Application No. PCT/US2019/030875, dated Aug. 21, 2019, pp. 1-23.
Notification of Transmittal of the International Preliminary Report on Patentability from the International Preliminary Examining Authority for International Application No. PCT/US2019/030880, dated Aug. 18, 2020, pp. 1-20.
Written Opinion of the International Preliminary Examining Authority, for International Application No. PCT/US2019/030880, dated Apr. 20, 2020, pp. 1-16.
Notification of Transmittal of the International Search Report and Written Opinion of the International Searching Authority, or the Declaration for International Application No. PCT/US2019/030880, dated Aug. 22, 2019, pp. 1-21.
Notification of Transmittal of the International Preliminary Report on Patentability from the International Preliminary Examining Authority for International Application No. PCT/US2019/030887, dated Aug. 17, 2020, pp. 1-19.
Written Opinion of the International Preliminary Examining Authority, for International Application No. PCT/US2019/030887, dated Apr. 29, 2020, pp. 1-16.
Notification of Transmittal of the International Search Report and Written Opinion of the International Searching Authority, or the Declaration for International Application No. PCT/US2019/030887, dated Aug. 21, 2019, pp. 1-23.
Notification of Transmittal of the International Preliminary Report on Patentability from the International Preliminary Examining Authority for International Application No. PCT/US2019/030893, dated Aug. 17, 2020, pp. 1-19.
Written Opinion of the International Preliminary Examining Authority, for International Application No. PCT/US2019/030893, dated Apr. 29, 2020, pp. 1-15.
Notification of Transmittal of the International Search Report and Written Opinion of the International Searching Authority, or the Declaration for International Application No. PCT/US2019/030893, dated Aug. 21, 2019, pp. 1-23.
Notification of Transmittal of the International Preliminary Report on Patentability from the International Preliminary Examining Authority for International Application No. PCT/US2019/030935, dated Aug. 28, 2020, pp. 1-20.
Written Opinion of the International Preliminary Examining Authority, for International Application No. PCT/US2019/030935, dated Apr. 8, 2020, pp. 1-12.
Notification of Transmittal of the International Search Report and Written Opinion of the International Searching Authority, or the Declaration for International Application No. PCT/US2019/030935, dated Aug. 21, 2019, pp. 1-25.
Notification of Transmittal of the International Preliminary Report on Patentability from the International Preliminary Examining Authority for International Application No. PCT/US2019/030937, dated Aug. 17, 2020, pp. 1-20.
Written Opinion of the International Preliminary Examining Authority, for International Application No. PCT/US2019/030937, dated Apr. 24, 2020, pp. 1-15.
Notification of Transmittal of the International Search Report and Written Opinion of the International Searching Authority, or the Declaration for International Application No. PCT/US2019/030937, dated Aug. 21, 2019, pp. 1-23.
Notification of Transmittal of the International Preliminary Report on Patentability from the International Preliminary Examining Authority for International Application No. PCT/US2019/030942, dated Aug. 6, 2020, pp. 1-15.
Written Opinion of the International Preliminary Examining Authority, for International Application No. PCT/US2019/030942, dated Apr. 22, 2020, pp. 1-14.

(56) References Cited

OTHER PUBLICATIONS

Notification of Transmittal of the International Search Report and Written Opinion of the International Searching Authority, or the Declaration for International Application No. PCT/US2019/030942, dated Aug. 21, 2019, pp. 1-21.
Notification of Transmittal of the International Preliminary Report on Patentability from the International Preliminary Examining Authority for International Application No. PCT/US2019/030944, dated Aug. 28, 2020, pp. 1-20.
Written Opinion of the International Preliminary Examining Authority, for International Application No. PCT/US2019/030944, dated Apr. 8, 2020, pp. 1-17.
Notification of Transmittal of the International Search Report and Written Opinion of the International Searching Authority, or the Declaration for International Application No. PCT/US2019/030944, dated Aug. 19, 2019, pp. 1-19.
Notification Concerning Informal Communications with the Applicant, from the International Preliminary Examining Authority for International Application No. PCT/US2019/030860, dated Aug. 19, 2020, pp. 1-3.
Notification Concerning Informal Communications with the Applicant, from the International Preliminary Examining Authority for International Application No. PCT/US2019/030870, dated Aug. 19, 2020, pp. 1-3.
Notification Concerning Informal Communications with the Applicant, from the International Preliminary Examining Authority for International Application No. PCT/US2019/030875, dated Aug. 19, 2020, pp. 1-3.
Notification Concerning Informal Communications with the Applicant, from the International Preliminary Examining Authority for International Application No. PCT/US2019/030880, dated Aug. 18, 2020, pp. 1-3.
Notification Concerning Informal Communications with the Applicant, from the International Preliminary Examining Authority for International Application No. PCT/US2019/030887, dated Aug. 17, 2020, pp. 1-3.
Notification Concerning Informal Communications with the Applicant, from the International Preliminary Examining Authority for International Application No. PCT/US2019/030893, dated Aug. 17, 2020, pp. 1-3.
Notification Concerning Informal Communications with the Applicant, from the International Preliminary Examining Authority for International Application No. PCT/US2019/030935, dated Aug. 19, 2020, pp. 1-3.
Notification Concerning Informal Communications with the Applicant, from the International Preliminary Examining Authority for International Application No. PCT/US2019/030937, dated Aug. 12, 2020, pp. 1-3.
Notification Concerning Informal Communications with the Applicant, from the International Preliminary Examining Authority for International Application No. PCT/US2019/030944, dated Aug. 19, 2020, pp. 1-3.

* cited by examiner

ADJUSTMENT OF LOAD ACCESS SIZE BY A MULTI-THREADED, SELF-SCHEDULING PROCESSOR TO MANAGE NETWORK CONGESTION

CROSS-REFERENCE TO A RELATED APPLICATION

This application is a nonprovisional of and claims the benefit of and priority to U.S. Provisional Patent Application No. 62/667,760, filed May 7, 2018, inventor Tony M. Brewer, titled "Reduction of Load Access Size by a Multi-Threaded, Self-Scheduling Processor to Manage Network Congestion", which is commonly assigned herewith, and all of which is hereby incorporated herein by reference in its entirety with the same full force and effect as if set forth in its entirety herein (hereinafter referred to as the "related application").

FIELD OF THE INVENTION

The present invention, in general, relates to configurable computing circuitry, and more particularly, relates to a heterogeneous computing system which includes a self-scheduling processor, configurable computing circuitry with an embedded interconnection network, dynamic reconfiguration, and dynamic control over energy or power consumption.

BACKGROUND OF THE INVENTION

Many existing computing systems have reached significant limits for computation processing capabilities, both in terms of speed of computation, energy (or power) consumption, and associated heat dissipation. For example, existing computing solutions have become increasingly inadequate as the need for advanced computing technologies grows, such as to accommodate artificial intelligence and other significant computing applications.

Accordingly, there is an ongoing need for a computing architecture capable of providing high performance using sparse data sets, involving limited or no data reuse, which typically cause poor cache hit rates. Such a computing architecture should be tolerant of latency to memory and allow high sustained executed instructions per clock.

There is also an ongoing need for a computing architecture capable of providing high performance and energy efficient solutions for compute-intensive kernels, such as for computation of Fast Fourier Transforms (FFTs) and finite impulse response (FIR) filters used in sensing, communication, and analytic applications, such as synthetic aperture radar, 5G base stations, and graph analytic applications such as graph clustering using spectral techniques, machine learning, 5G networking algorithms, and large stencil codes, for example and without limitation.

There is also an ongoing need for a processor architecture capable of significant parallel processing and further interacting with and controlling a configurable computing architecture for performance of any of these various applications.

SUMMARY OF THE INVENTION

As discussed in greater detail below, the representative apparatus, system and method provide for a computing architecture capable of providing high performance and energy efficient solutions for compute-intensive kernels, such as for computation of Fast Fourier Transforms (FFTs) and finite impulse response (FIR) filters used in sensing, communication, and analytic applications, such as synthetic aperture radar, 5G base stations, and graph analytic applications such as graph clustering using spectral techniques, machine learning, 5G networking algorithms, and large stencil codes, for example and without limitation.

As mentioned above, sparse data sets typically cause poor cache hit rates. The representative apparatus, system and method provide for a computing architecture capable of allowing some threads to be waiting for response from memory while other threads are continuing to execute instructions. This style of compute is tolerant of latency to memory and allows high sustained executed instructions per clock.

Also as discussed in greater detail below, the representative apparatus, system and method provide for a processor architecture capable of self-scheduling, significant parallel processing and further interacting with and controlling a configurable computing architecture for performance of any of these various applications.

A self-scheduling processor is disclosed. In a representative embodiment, the processor comprises: a processor core adapted to execute a received instruction; and a core control circuit coupled to the processor core, the core control circuit adapted to automatically schedule an instruction for execution by the processor core in response to a received work descriptor data packet. In another representative embodiment, the processor comprises: a processor core adapted to execute a received instruction; and a core control circuit coupled to the processor core, the core control circuit adapted to automatically schedule an instruction for execution by the processor core in response to a received event data packet.

A multi-threaded, self-scheduling processor is also disclosed which can create threads on local or remote compute elements. In a representative embodiment, the processor comprises: a processor core adapted to execute a fiber create instruction; and a core control circuit coupled to the processor core, the core control circuit adapted to automatically schedule the fiber create instruction for execution by the processor core and generate one or more work descriptor data packets to another processor or hybrid threading fabric circuit for execution of a corresponding plurality of execution threads. In another representative embodiment, the processor comprises: a processor core adapted to execute a fiber create instruction; and a core control circuit coupled to the processor core, the core control circuit adapted to schedule the fiber create instruction for execution by the processor core, to reserve a predetermined amount of memory space in a thread control memory to store return arguments, and to generate one or more work descriptor data packets to another processor or hybrid threading fabric circuit for execution of a corresponding plurality of execution threads.

In another representative embodiment, a processor comprises: a core control circuit comprising: an interconnection network interface; a thread control memory coupled to the interconnection network interface; an execution queue coupled to the thread control memory; a control logic and thread selection circuit coupled to the execution queue, to the thread control memory; and an instruction cache coupled to the control logic and thread selection circuit; and further, a processor core is coupled to the instruction cache of the core control circuit.

In another representative embodiment, a processor comprises: a core control circuit comprising: an interconnection network interface; a thread control memory coupled to the interconnection network interface; a network response memory; an execution queue coupled to the thread control memory; a control logic and thread selection circuit coupled to the execution queue, to the thread control memory; an instruction cache coupled to the control logic and thread selection circuit; and a command queue; and further, a processor core is coupled to the instruction cache and to the command queue of the core control circuit.

In another representative embodiment, a processor comprises: a processor core and a core control circuit coupled to the processor core, with the core control circuit comprising: an interconnection network interface coupleable to an interconnection network to receive a work descriptor data packet, to decode the received work descriptor data packet into an execution thread having an initial program count and any received argument; an execution queue coupled to the thread control memory; and a control logic and thread selection circuit coupled to the execution queue, the control logic and thread selection circuit adapted to assign an available thread identifier to the execution thread, to automatically place the thread identifier in the execution queue, and to periodically select the thread identifier for execution of the execution thread.

In another representative embodiment, a processor comprises: a processor core and a core control circuit coupled to the processor core, with the core control circuit comprising: an interconnection network interface coupleable to an interconnection network to receive a work descriptor data packet, to decode the received work descriptor data packet into an execution thread having an initial program count and any received argument; an execution queue coupled to the thread control memory; and a control logic and thread selection circuit coupled to the execution queue, the control logic and thread selection circuit adapted to assign an available thread identifier to the execution thread, to automatically place the thread identifier in the execution queue, and to periodically select the thread identifier for execution of an instruction of an execution thread by a processor core.

In another representative embodiment, a processor comprises: a processor core and a core control circuit coupled to the processor core, with the core control circuit comprising: an execution queue coupled to the thread control memory; and a control logic and thread selection circuit coupled to the execution queue, the control logic and thread selection circuit adapted to assign an available thread identifier to the execution thread, to automatically place the thread identifier in the execution queue, and to periodically select the thread identifier for execution of an instruction of an execution thread by the processor core.

In another representative embodiment, a processor comprises: a processor core and a core control circuit coupled to the processor core, with the core control circuit comprising: a thread control memory comprising a plurality of registers, the plurality of registers comprising a thread identifier pool register storing a plurality of thread identifiers, a program count register storing a received program count, a data cache, and a general purpose register storing a received argument; an execution queue coupled to the thread control memory; and a control logic and thread selection circuit coupled to the execution queue, the control logic and thread selection circuit adapted to assign an available thread identifier to the execution thread, to automatically place the thread identifier in the execution queue, and to periodically select the thread identifier for execution of an instruction of the execution thread by the processor core, the processor core using data stored in the data cache or general purpose register.

In another representative embodiment, a processor comprises: a processor core and a core control circuit coupled to the processor core, with the core control circuit comprising: a thread control memory comprising a plurality of registers, the plurality of registers comprising a thread identifier pool register storing a plurality of thread identifiers, a program count register storing a received program count, and thread state registers storing a valid state or a paused state for each thread identifier of the plurality of thread identifiers; an execution queue coupled to the thread control memory; and a control logic and thread selection circuit coupled to the execution queue, the control logic and thread selection circuit adapted to assign an available thread identifier to the execution thread, to automatically place the thread identifier in the execution queue when it has a valid state, and for as long as the valid state remains, to periodically select the thread identifier for execution of an instruction of the execution thread by the processor core until completion of the execution thread.

In another representative embodiment, a processor comprises: a processor core and a core control circuit coupled to the processor core, with the core control circuit comprising: a thread control memory comprising a plurality of registers, the plurality of registers comprising a thread identifier pool register storing a plurality of thread identifiers, a program count register storing a received program count, and thread state registers storing a valid state or a paused state for each thread identifier of the plurality of thread identifiers; an execution queue coupled to the thread control memory; and a control logic and thread selection circuit coupled to the execution queue, the control logic and thread selection circuit adapted to assign an available thread identifier to the execution thread, to automatically place the thread identifier in the execution queue when it has a valid state, and for as long as the valid state remains, to periodically select the thread identifier for execution of an instruction of the execution thread by the processor core, and to pause thread execution by not returning the thread identifier to the execution queue when it has a pause state.

In another representative embodiment, a processor comprises: a processor core and a core control circuit coupled to the processor core, with the core control circuit comprising: a thread control memory comprising a plurality of registers, the plurality of registers comprising a thread identifier pool register storing a plurality of thread identifiers, a thread state register, a program count register storing a received program count, a data cache, and a general purpose register storing a received argument; an execution queue coupled to the thread control memory; and a control logic and thread selection circuit coupled to the execution queue, the control logic and thread selection circuit adapted to assign an available thread identifier to the execution thread, to automatically place the thread identifier in the execution queue, and to periodically select the thread identifier for execution of an instruction of an execution thread by the processor core.

In another representative embodiment, a processor comprises: a processor core adapted to execute a plurality of instructions; and a core control circuit coupled to the processor core, with the core control circuit comprising: an interconnection network interface coupleable to an interconnection network to receive a work descriptor data packet, to decode the received work descriptor data packet into an execution thread having an initial program count and any received argument; a thread control memory coupled to the interconnection network interface and comprising a plurality of registers, the plurality of registers comprising a thread identifier pool register storing a plurality of thread identifiers, a thread state register, a program count register storing the received program count, a data cache, and a general purpose register storing the received argument; an execution queue coupled to the thread control memory; a control logic and thread selection circuit coupled to the execution queue and to the thread control memory, the control logic and thread selection circuit adapted to assign an available thread identifier to the execution thread, to place the thread identifier in the execution queue, to select the thread identifier for execution, to access the thread control memory using the thread identifier as an index to select the initial program count for the execution thread; and an instruction cache coupled to the processor core and to the control logic and thread selection circuit to receive the initial program count and provide to the processor core a corresponding instruction for execution, of the plurality of instructions.

In another representative embodiment, a processor comprises: a core control circuit comprising: an interconnection network interface coupleable to an interconnection network to receive a work descriptor data packet, to decode the received work descriptor data packet into an execution thread having an initial program count and any received argument; a thread control memory coupled to the interconnection network interface and comprising a plurality of registers, the plurality of registers comprising a thread identifier pool register storing a plurality of thread identifiers, a thread state register, a program count register storing the received program count, a data cache, and a general purpose register storing the received argument; an execution queue coupled to the thread control memory; a control logic and thread selection circuit coupled to the execution queue and to the thread control memory, the control logic and thread selection circuit adapted to assign an available thread identifier to the execution thread, to automatically place the thread identifier in the execution queue, to periodically select the thread identifier for execution, to access the thread control memory using the thread identifier as an index to select the initial program count for the execution thread; and an instruction cache coupled to the control logic and thread selection circuit to receive the initial program count and provide a corresponding instruction for execution; and further, a processor core is coupled to the instruction cache of the core control circuit, the processor core adapted to execute the corresponding instruction.

In another representative embodiment, a processor comprises: a core control circuit comprising: an interconnection network interface coupleable to an interconnection network to receive a work descriptor data packet, to decode the received work descriptor data packet into an execution thread having an initial program count and any received argument; a thread control memory coupled to the interconnection network interface and comprising a plurality of registers, the plurality of registers comprising a thread identifier pool register storing a plurality of thread identifiers, a thread state register, a program count register storing the received program count, and a general purpose register storing the received argument; an execution queue coupled to the thread control memory; a control logic and thread selection circuit coupled to the execution queue and to the thread control memory, the control logic and thread selection circuit adapted to assign an available thread identifier to the execution thread, to place the thread identifier in the execution queue, to select the thread identifier for execution, to access the thread control memory using the thread identifier as an index to select the initial program count for the execution thread; an instruction cache coupled to the control logic and thread selection circuit to receive the initial program count and provide a corresponding instruction for execution; and a command queue; and further, a processor core is coupled to the instruction cache and the command queue of the core control circuit, the processor core adapted to execute the corresponding instruction.

In another representative embodiment, a processor comprises: a core control circuit coupled to the interconnection network interface and comprising: an interconnection network interface coupleable to an interconnection network to receive a work descriptor data packet, to decode the received work descriptor data packet into an execution thread having an initial program count and any received argument; a thread control memory coupled to the interconnection network interface and comprising a plurality of registers, the plurality of registers comprising a thread identifier pool register storing a plurality of thread identifiers, a thread state register, a program count register storing the received program count, and a general purpose register storing the received argument; an execution queue coupled to the thread control memory; a control logic and thread selection circuit coupled to the execution queue and to the thread control memory, the control logic and thread selection circuit adapted to assign an available thread identifier to the execution thread, to place the thread identifier in the execution queue, to select the thread identifier for execution, to access the thread control memory using the thread identifier as an index to select the initial program count for the execution thread, and an instruction cache coupled to the control logic and thread selection circuit to receive the initial program count and provide a corresponding instruction for execution; and further, a processor core is coupled to the instruction cache of the core control circuit, the processor core adapted to execute the corresponding instruction.

In another representative embodiment, a processor comprises: a core control circuit comprising: an interconnection network interface coupleable to an interconnection network to receive a call work descriptor data packet, to decode the received work descriptor data packet into an execution thread having an initial program count and any received argument, and to encode a work descriptor packet for transmission to other processing elements; a thread control memory coupled to the interconnection network interface and comprising a plurality of registers, the plurality of registers comprising a thread identifier pool register storing a plurality of thread identifiers, a thread state register, a program count register storing the received program count, and a general purpose register storing the received argument; an execution queue coupled to the thread control memory; a network response memory coupled to the interconnection network interface; a control logic and thread selection circuit coupled to the execution queue, to the thread control memory, and to the instruction cache, the control logic and thread selection circuit adapted to assign an available thread identifier to the execution thread, to place the thread identifier in the execution queue, to select the thread identifier for execution, to access the thread control memory using the thread identifier as an index to select the initial program count for the execution thread; an instruction cache coupled to the control logic and thread selection circuit to receive the initial program count and provide a corresponding instruction for execution; and a command queue storing one or more commands for generation of one or more work descriptor packets; and further, a processor core is coupled to the instruction cache and the command queue of the core control circuit, the processor core adapted to execute the corresponding instruction.

For any of the various representative embodiments, the core control circuit may further comprise: an interconnection network interface coupleable to an interconnection network, the interconnection network interface adapted to receive a work descriptor data packet, to decode the received work descriptor data packet into an execution thread having an initial program count and any received argument. For any of the various representative embodiments, the interconnection network interface may be further adapted to receive an event data packet, to decode the received event data packet into an event identifier and any received argument.

For any of the various representative embodiments, the core control circuit may further comprise: a control logic and thread selection circuit coupled to the interconnection network interface, the control logic and thread selection circuit adapted to assign an available thread identifier to the execution thread.

For any of the various representative embodiments, the core control circuit may further comprise: a thread control memory having a plurality of registers, with the plurality of registers comprising one or more of the following, in any selected combination: a thread identifier pool register storing a plurality of thread identifiers; a thread state register; a program count register storing a received initial program count; a general purpose register storing the received argument; a pending fiber return count register; a return argument buffer or register; a return argument link list register; a custom atomic transaction identifier register; an event state register; an event mask register; and a data cache.

For any of the various representative embodiments, the interconnection network interface may be further adapted to store the execution thread having the initial program count and any received argument in the thread control memory using a thread identifier as an index to the thread control memory.

For any of the various representative embodiments, the core control circuit may further comprise: a control logic and thread selection circuit coupled to the thread control memory and to the interconnection network interface, the control logic and thread selection circuit adapted to assign an available thread identifier to the execution thread.

For any of the various representative embodiments, the core control circuit may further comprise: an execution queue coupled to the thread control memory, the execution queue storing one or more thread identifiers.

For any of the various representative embodiments, the core control circuit may further comprise: a control logic and thread selection circuit coupled to the execution queue, to the interconnection network interface, and to the thread control memory, the control logic and thread selection circuit adapted to assign an available thread identifier to the execution thread, to place the thread identifier in the execution queue, to select the thread identifier for execution, and to access the thread control memory using the thread identifier as an index to select the initial program count for the execution thread.

For any of the various representative embodiments, the core control circuit may further comprise: an instruction cache coupled to the control logic and thread selection circuit to receive the initial program count and provide a corresponding instruction for execution.

In another representative embodiment, the processor further may further comprise: a processor core coupled to the instruction cache of the core control circuit, the processor core adapted to execute the corresponding instruction.

For any of the various representative embodiments, the core control circuit may be further adapted to assign an initial valid state to the execution thread. For any of the various representative embodiments, the core control circuit may be further adapted to assign a pause state to the execution thread in response to the processor core executing a memory load instruction. For any of the various representative embodiments, the core control circuit may be further adapted to assign a pause state to the execution thread in response to the processor core executing a memory store instruction.

For any of the various representative embodiments, the core control circuit may be further adapted to end execution of a selected thread in response to the execution of a return instruction by the processor core. For any of the various representative embodiments, the core control circuit may be further adapted to return a corresponding thread identifier of the selected thread to the thread identifier pool register in response to the execution of a return instruction by the processor core. For any of the various representative embodiments, the core control circuit may be further adapted to clear the registers of the thread control memory indexed by the corresponding thread identifier of the selected thread in response to the execution of a return instruction by the processor core.

For any of the various representative embodiments, the interconnection network interface may be further adapted to generate a return work descriptor packet in response to the execution of a return instruction by the processor core.

For any of the various representative embodiments, the core control circuit may further comprise: a network response memory. For any of the various representative embodiments, the network response memory may comprise one or more of the following, in any selected combination: a memory request register; a thread identifier and transaction identifier register; a request cache line index register; a bytes register; and a general purpose register index and type register.

For any of the various representative embodiments, the interconnection network interface may be adapted to generate a point-to-point event data message. For any of the various representative embodiments, the interconnection network interface may be adapted to generate a broadcast event data message.

For any of the various representative embodiments, the core control circuit may be further adapted to use an event mask stored in the event mask register to respond to a received event data packet. For any of the various representative embodiments, the core control circuit may be further adapted to determine an event number corresponding to a received event data packet. For any of the various representative embodiments, the core control circuit may be further adapted to change the status of a thread identifier from pause to valid in response to a received event data packet to resume execution of a corresponding execution thread. For any of the various representative embodiments, the core control circuit may be further adapted to change the status of a thread identifier from pause to valid in response to an event number of a received event data packet to resume execution of a corresponding execution thread.

For any of the various representative embodiments, the control logic and thread selection circuit may be further adapted to successively select a next thread identifier from the execution queue for execution of a single instruction of a corresponding execution thread. For any of the various representative embodiments, the control logic and thread selection circuit may be further adapted to perform a round-robin selection of a next thread identifier from the execution queue, of the plurality of thread identifiers, each for execution of a single instruction of a corresponding execution thread. For any of the various representative embodiments, the control logic and thread selection circuit may be further adapted to perform a round-robin selection of a next thread identifier from the execution queue, of the plurality of thread identifiers, each for execution of a single instruction of a corresponding execution thread until completion of the execution thread. For any of the various representative embodiments, the control logic and thread selection circuit may be further adapted to perform a barrel selection of a next thread identifier from the execution queue, of the plurality of thread identifiers, each for execution of a single instruction of a corresponding execution thread.

For any of the various representative embodiments, the control logic and thread selection circuit may be further adapted to assign a valid status or a pause status to a thread identifier. For any of the various representative embodiments, the control logic and thread selection circuit may be further adapted to assign a priority status to a thread identifier. For any of the various representative embodiments, the control logic and thread selection circuit may be further adapted to, following execution of a corresponding instruction, to return the corresponding thread identifier to the execution queue with an assigned valid status and an assigned priority.

For any of the various representative embodiments, the core control circuit may further comprise: a network command queue coupled to the processor core.

For any of the various representative embodiments, the interconnection network interface may comprise: an input queue; a packet decoder circuit coupled to the input queue, to the control logic and thread selection circuit, and to the thread control memory; an output queue; and a packet encoder circuit coupled to the output queue, to the network response memory, and to the network command queue.

For any of the various representative embodiments, the execution queue may further comprise: a first priority queue; and a second priority queue. For any of the various representative embodiments, the control logic and thread selection circuit may further comprise: thread selection control circuitry coupled to the execution queue, the thread selection control circuitry adapted to select a thread identifier from the first priority queue at a first frequency and to select a thread identifier from the second priority queue at a second frequency, the second frequency lower than the first frequency. For any of the various representative embodiments, the thread selection control circuitry may be adapted to determine the second frequency as a skip count from selection of a thread identifier from the first priority queue.

For any of the various representative embodiments, the core control circuit may further comprise: data path control circuitry adapted to control access size over the first interconnection network. For any of the various representative embodiments, the core control circuit may further comprise: data path control circuitry adapted to increase or decrease memory load access size in response to time averaged usage levels. For any of the various representative embodiments, the core control circuit may further comprise: data path control circuitry adapted to increase or decrease memory store access size in response to time averaged usage levels. For any of the various representative embodiments, the control logic and thread selection circuit may be further adapted to increase a size of a memory load access request to correspond to a cache line boundary of the data cache.

For any of the various representative embodiments, the core control circuit may further comprise: system call circuitry adapted to generate one or more system calls to a host processor. For any of the various representative embodiments, the system call circuitry may further comprise: a plurality of system call credit registers storing a predetermined credit count to modulate a number of system calls in any predetermined period of time.

For any of the various representative embodiments, the core control circuit may be further adapted, in response to a request from a host processor, to generate a command to the command queue for the interconnection network interface to copy and transmit all data from the thread control memory corresponding to a selected thread identifier for monitoring thread state.

For any of the various representative embodiments, the processor core may be adapted to execute a fiber create instruction to generate one or more commands to the command queue for the interconnection network interface to generate one or more call work descriptor packets to another processor core or to a hybrid threading fabric circuit. For any of the various representative embodiments, the core control circuit may be further adapted, in response to execution of a fiber create instruction by the processor core, to reserve a predetermined amount of memory space in the general purpose registers or return argument registers.

For any of the various representative embodiments, in response to the generation of one or more call work descriptor packets to another processor core or to a hybrid threading fabric, the core control circuit may be adapted to store a thread return count in the thread return register. For any of the various representative embodiments, in response to receipt of a return data packet, the core control circuit may be adapted to decrement the thread return count stored in the thread return register. For any of the various representative embodiments, in response to the thread return count in the thread return register being decremented to zero, the core control circuit may be adapted to change a paused status to a valid status for a corresponding thread identifier for subsequent execution of a thread return instruction for completion of the created fibers or threads.

For any of the various representative embodiments, the processor core may be adapted to execute a waiting or nonwaiting fiber join instruction. For any of the various representative embodiments, the processor core may be adapted to execute a fiber join all instruction.

For any of the various representative embodiments, the processor core may be adapted to execute a non-cached read or load instruction to designate a general purpose register for storage of data received from a memory. For any of the various representative embodiments, the processor core may be adapted to execute a non-cached write or store instruction to designate data in a general purpose register for storage in a memory.

For any of the various representative embodiments, the core control circuit may be adapted to assign a transaction identifier to any load or store request to memory and to correlate the transaction identifier with a thread identifier.

For any of the various representative embodiments, the processor core may be adapted to execute a first thread priority instruction to assign a first priority to an execution thread having a corresponding thread identifier. For any of the various representative embodiments, the processor core may be adapted to execute a second thread priority instruction to assign a second priority to an execution thread having a corresponding thread identifier.

For any of the various representative embodiments, the processor core may be adapted to execute a custom atomic return instruction to complete an executing thread of a custom atomic operation. For any of the various representative embodiments, in conjunction with a memory controller, the processor core may be adapted to execute a floating point atomic memory operation. For any of the various representative embodiments, in conjunction with a memory controller, the processor core may be adapted to execute a custom atomic memory operation.

A method of self-scheduling execution of an instruction is also disclosed, with a representative method embodiment comprising: receiving a work descriptor data packet; and automatically scheduling the instruction for execution in response to the received work descriptor data packet.

Another method of self-scheduling execution of an instruction is also disclosed, with a representative method embodiment comprising: receiving an event data packet; and automatically scheduling the instruction for execution in response to the received event data packet.

A method of a first processing element to generate a plurality of execution threads for performance by a second processing element is also disclosed, with a representative method embodiment comprising: executing a fiber create instruction; and in response to the execution of the fiber create instruction generating one or more work descriptor data packets to the second processing element for execution of the plurality of execution threads.

A method of a first processing element to generate a plurality of execution threads for performance by a second processing element is also disclosed, with a representative method embodiment comprising: executing a fiber create instruction; and in response to the execution of the fiber create instruction reserving a predetermined amount of memory space in a thread control memory to store return arguments and generating one or more work descriptor data packets to the second processing element for execution of the plurality of execution threads.

A method of self-scheduling execution of an instruction is also disclosed, with a representative method embodiment comprising: receiving a work descriptor data packet; decoding the received work descriptor data packet into an execution thread having an initial program count and any received argument; assigning an available thread identifier to the execution thread; automatically queuing the thread identifier for execution of the execution thread; and periodically selecting the thread identifier for execution of the execution thread.

Another method of self-scheduling execution of an instruction is also disclosed, with a representative method embodiment comprising: receiving a work descriptor data packet; decoding the received work descriptor data packet into an execution thread having an initial program count and any received argument; assigning an available thread identifier to the execution thread; automatically queuing the thread identifier for execution of the execution thread when it has a valid state; and for as long as the valid state remains, periodically selecting the thread identifier for execution of an instruction of the execution thread until completion of the execution thread.

Another method of self-scheduling execution of an instruction is also disclosed, with a representative method embodiment comprising: receiving a work descriptor data packet; decoding the received work descriptor data packet into an execution thread having an initial program count and any received argument; assigning an available thread identifier to the execution thread; automatically queuing the thread identifier in an execution queue for execution of the execution thread when it has a valid state; and for as long as the valid state remains, periodically selecting the thread identifier for execution of an instruction of the execution thread; and pausing thread execution by not returning the thread identifier to the execution queue when it has a pause state.

Another method of self-scheduling execution of an instruction is also disclosed, with a representative method embodiment comprising: receiving a work descriptor data packet; decoding the received work descriptor data packet into an execution thread having an initial program count and any received argument; storing the initial program count and any received argument in a thread control memory; assigning an available thread identifier to the execution thread; automatically queuing the thread identifier for execution of the execution thread when it has a valid state; accessing the thread control memory using the thread identifier as an index to select the initial program count for the execution thread; and for as long as the valid state remains, periodically selecting the thread identifier for execution of an instruction of the execution thread until completion of the execution thread.

For any of the various representative embodiments, the method may further comprise: receiving an event data packet; and decoding the received event data packet into an event identifier and any received argument.

For any of the various representative embodiments, the method may further comprise: assigning an initial valid state to the execution thread.

For any of the various representative embodiments, the method may further comprise: assigning a pause state to the execution thread in response to the execution of a memory load instruction. For any of the various representative embodiments, the method may further comprise: assigning a pause state to the execution thread in response to the execution of a memory store instruction.

For any of the various representative embodiments, the method may further comprise: terminating execution of a selected thread in response to the execution of a return instruction. For any of the various representative embodiments, the method may further comprise: returning a corresponding thread identifier of the selected thread to the thread identifier pool in response to the execution of a return instruction. For any of the various representative embodiments, the method may further comprise: clearing the registers of a thread control memory indexed by the corresponding thread identifier of the selected thread in response to the execution of a return instruction. For any of the various representative embodiments, the method may further comprise: generating a return work descriptor packet in response to the execution of a return instruction.

For any of the various representative embodiments, the method may further comprise: generating a point-to-point event data message. For any of the various representative embodiments, the method may further comprise: generating a broadcast event data message.

For any of the various representative embodiments, the method may further comprise: using an event mask to respond to a received event data packet. For any of the various representative embodiments, the method may further comprise: determining an event number corresponding to a received event data packet. For any of the various representative embodiments, the method may further comprise: changing the status of a thread identifier from pause to valid in response to a received event data packet to resume execution of a corresponding execution thread. For any of the various representative embodiments, the method may further comprise: changing the status of a thread identifier from pause to valid in response to an event number of a received event data packet to resume execution of a corresponding execution thread.

For any of the various representative embodiments, the method may further comprise: successively selecting a next thread identifier from the execution queue for execution of a single instruction of a corresponding execution thread. For any of the various representative embodiments, the method may further comprise: performing a round-robin selection of a next thread identifier from the execution queue, of the plurality of thread identifiers, each for execution of a single instruction of a corresponding execution thread. For any of the various representative embodiments, the method may further comprise: performing a round-robin selection of a next thread identifier from the execution queue, of the plurality of thread identifiers, each for execution of a single instruction of a corresponding execution thread until completion of the execution thread. For any of the various representative embodiments, the method may further comprise: performing a barrel selection of a next thread identifier from the execution queue, of the plurality of thread identifiers, each for execution of a single instruction of a corresponding execution thread.

For any of the various representative embodiments, the method may further comprise: assigning a valid status or a pause status to a thread identifier. For any of the various representative embodiments, the method may further comprise: assigning a priority status to a thread identifier.

For any of the various representative embodiments, the method may further comprise: following execution of a corresponding instruction, returning the corresponding thread identifier to the execution queue with an assigned valid status and an assigned priority.

For any of the various representative embodiments, the method may further comprise: selecting a thread identifier from a first priority queue at a first frequency and selecting a thread identifier from a second priority queue at a second frequency, the second frequency lower than the first frequency. For any of the various representative embodiments, the method may further comprise: determining the second frequency as a skip count from selection of a thread identifier from the first priority queue.

For any of the various representative embodiments, the method may further comprise: controlling data path access size. For any of the various representative embodiments, the method may further comprise: increasing or decreasing memory load access size in response to time averaged usage levels. For any of the various representative embodiments, the method may further comprise: increasing or decreasing memory store access size in response to time averaged usage levels. For any of the various representative embodiments, the method may further comprise: increasing a size of a memory load access request to correspond to a cache line boundary of the data cache.

For any of the various representative embodiments, the method may further comprise: generating one or more system calls to a host processor. For any of the various representative embodiments, the method may further comprise: using a predetermined credit count, modulating a number of system calls in any predetermined period of time.

For any of the various representative embodiments, the method may further comprise: in response to a request from a host processor, copying and transmitting all data from a thread control memory corresponding to a selected thread identifier for monitoring thread state.

For any of the various representative embodiments, the method may further comprise: executing a fiber create instruction to generate one or more commands to generate one or more call work descriptor packets to another processor core or to a hybrid threading fabric circuit. For any of the various representative embodiments, the method may further comprise: in response to execution of a fiber create instruction, reserving a predetermined amount of memory space for storing any return arguments. For any of the various representative embodiments, the method may further comprise: in response to the generation of one or more call work descriptor packets, storing a thread return count in the thread return register. For any of the various representative embodiments, the method may further comprise: in response to receipt of a return data packet, decrementing the thread return count stored in the thread return register. For any of the various representative embodiments, the method may further comprise: in response to the thread return count in the thread return register being decremented to zero, changing a paused status to a valid status for a corresponding thread identifier for subsequent execution of a thread return instruction for completion of the created fibers or threads.

For any of the various representative embodiments, the method may further comprise: executing a waiting or non-waiting fiber join instruction. For any of the various representative embodiments, the method may further comprise: executing a fiber join all instruction.

For any of the various representative embodiments, the method may further comprise: executing a non-cached read or load instruction to designate a general purpose register for storage of data received from a memory.

For any of the various representative embodiments, the method may further comprise: executing a non-cached write or store instruction to designate data in a general purpose register for storage in a memory.

For any of the various representative embodiments, the method may further comprise: assigning a transaction identifier to any load or store request to memory and to correlate the transaction identifier with a thread identifier.

For any of the various representative embodiments, the method may further comprise: executing a first thread priority instruction to assign a first priority to an execution thread having a corresponding thread identifier. For any of the various representative embodiments, the method may further comprise: executing a second thread priority instruction to assign a second priority to an execution thread having a corresponding thread identifier.

For any of the various representative embodiments, the method may further comprise: executing a custom atomic return instruction to complete an executing thread of a custom atomic operation.

For any of the various representative embodiments, the method may further comprise: executing a floating point atomic memory operation.

For any of the various representative embodiments, the method may further comprise: executing a custom atomic memory operation.

Numerous other advantages and features of the present invention will become readily apparent from the following detailed description of the invention and the embodiments thereof, from the claims and from the accompanying drawings.

BRIEF DESCRIPTION OF THE DRAWINGS

The objects, features and advantages of the present invention will be more readily appreciated upon reference to the following disclosure when considered in conjunction with the accompanying drawings, wherein like reference numerals are used to identify identical components in the various views, and wherein reference numerals with alphabetic characters are utilized to identify additional types, instantiations or variations of a selected component embodiment in the various views, in which.

DETAILED DESCRIPTION OF REPRESENTATIVE EMBODIMENTS

Figure 1:
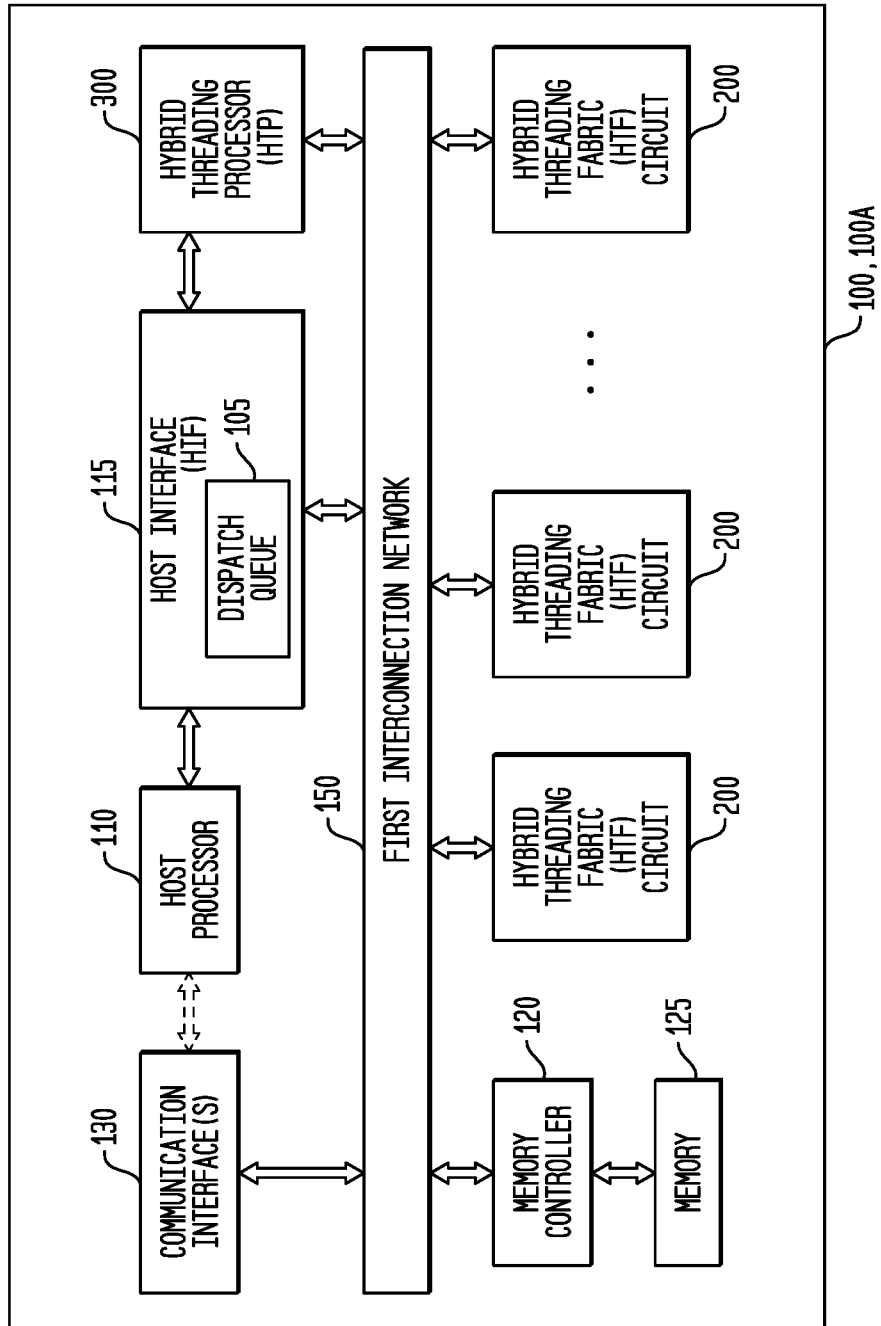
FIG. 1 is a block diagram of a representative first embodiment of a hybrid computing system.

While the present invention is susceptible of embodiment in many different forms, there are shown in the drawings and will be described herein in detail specific exemplary embodiments thereof, with the understanding that the present disclosure is to be considered as an exemplification of the principles of the invention and is not intended to limit the invention to the specific embodiments illustrated. In this respect, before explaining at least one embodiment consistent with the present invention in detail, it is to be understood that the invention is not limited in its application to the details of construction and to the arrangements of components set forth above and below, illustrated in the drawings, or as described in the examples. Methods and apparatuses consistent with the present invention are capable of other embodiments and of being practiced and carried out in various ways. Also, it is to be understood that the phraseology and terminology employed herein, as well as the abstract included below, are for the purposes of description and should not be regarded as limiting.

Figure 2:
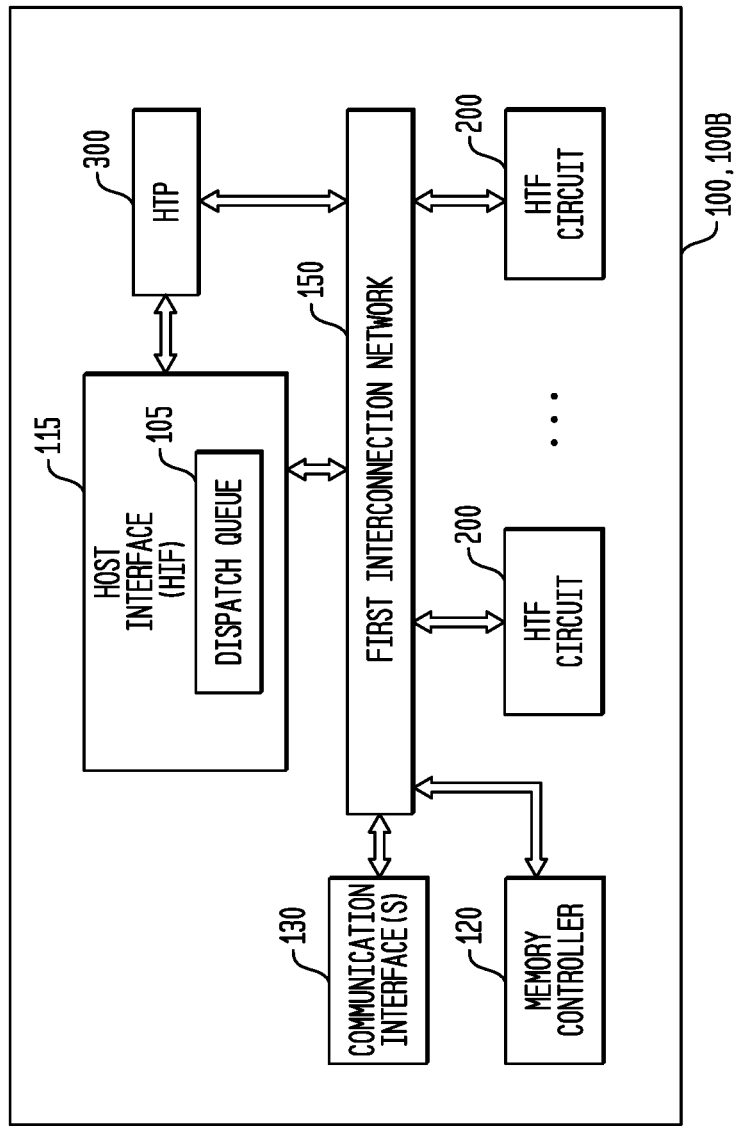
FIG. 2 is a block diagram of a representative second embodiment of a hybrid computing system.
Figure 3:
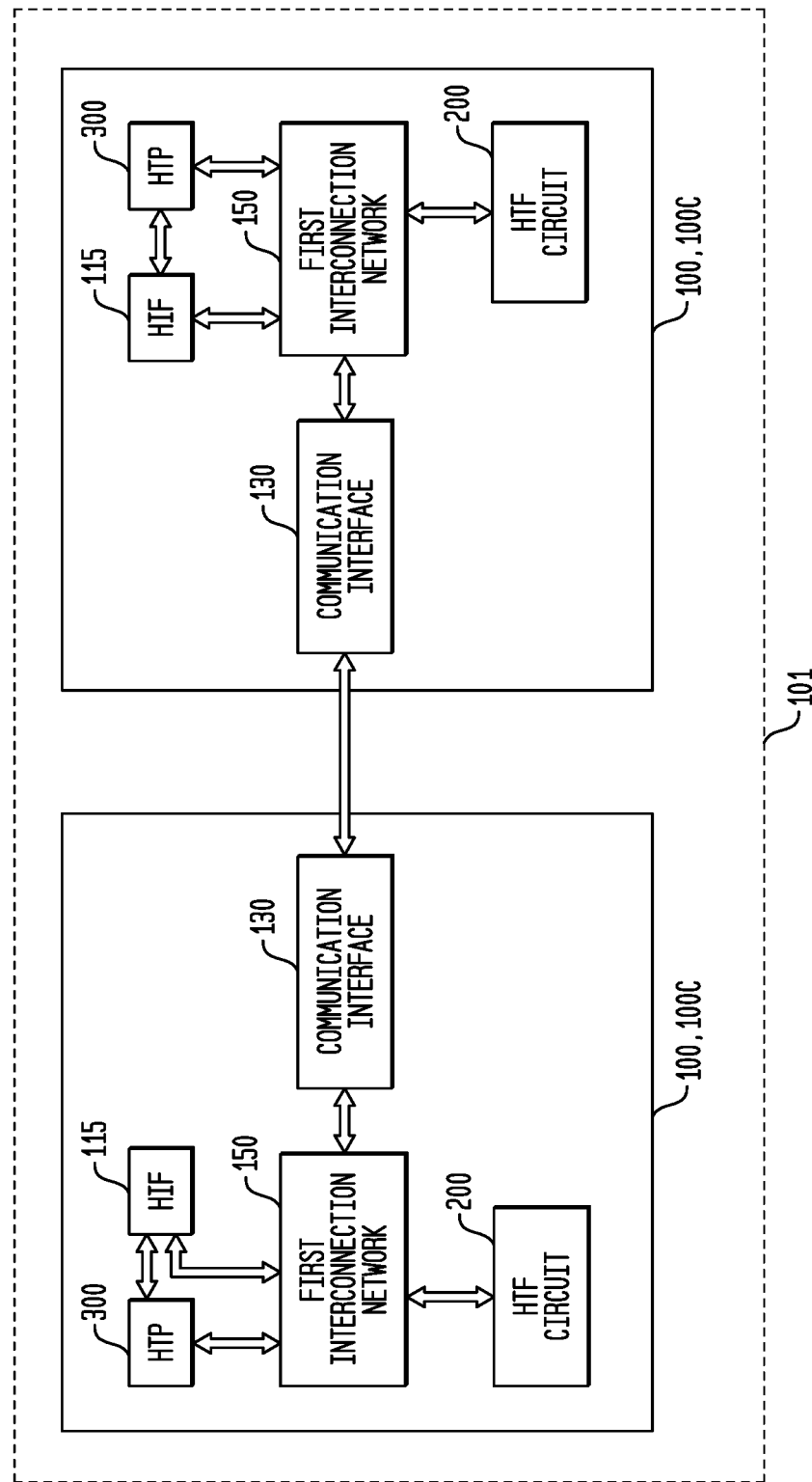
FIG. 3 is a block diagram of a representative third embodiment of a hybrid computing system.
Figure 4:
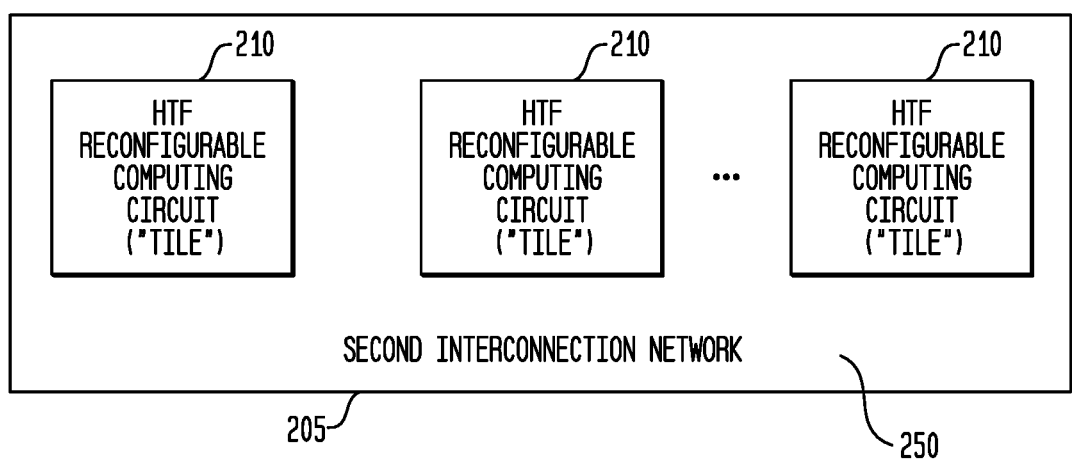
FIG. 4 is a high-level block diagram of a portion of a representative embodiment of a hybrid threading fabric circuit cluster.
Figure 5:
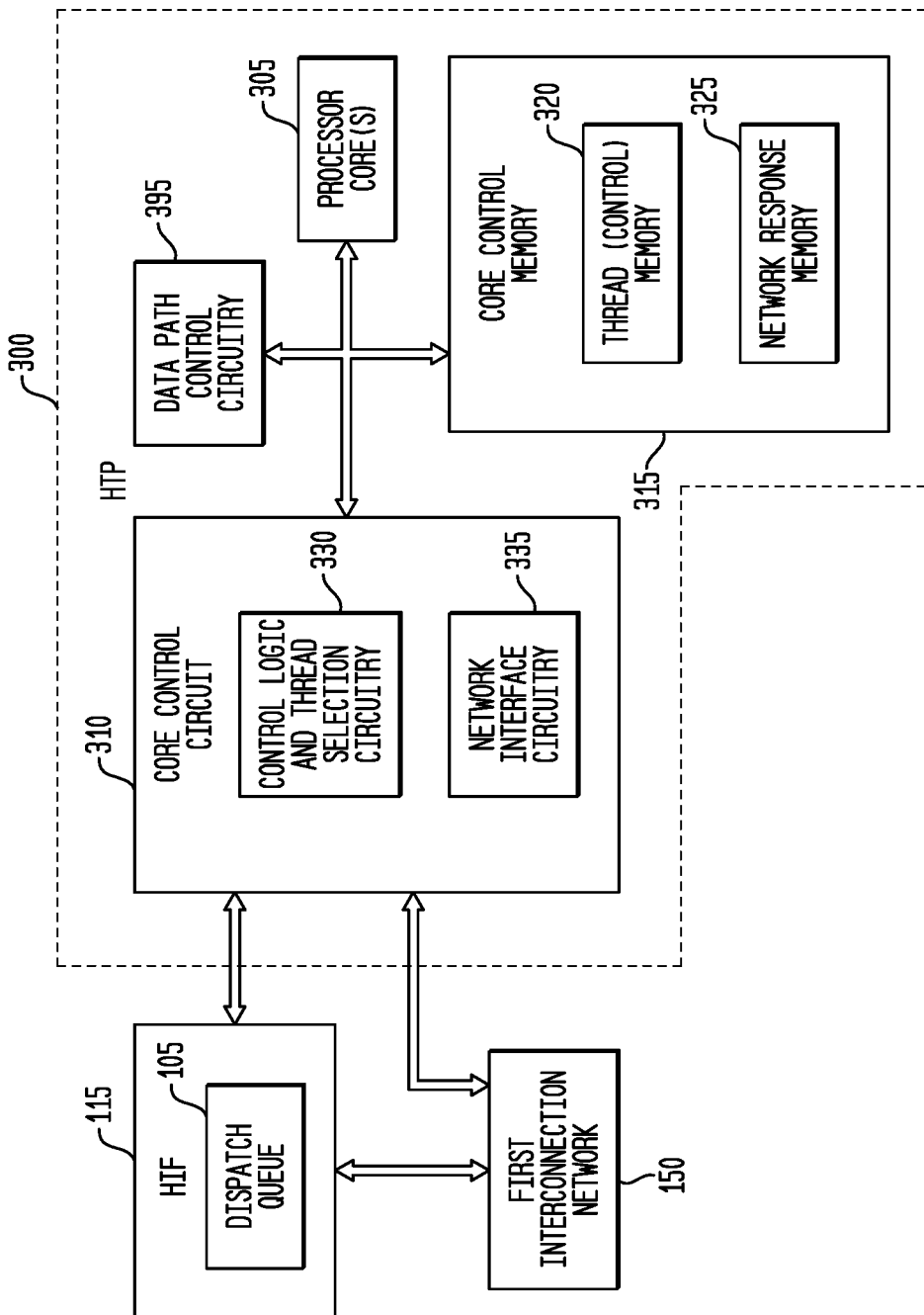
FIG. 5 is a high-level block diagram of a representative embodiment of a hybrid threading processor.
Figure 6:
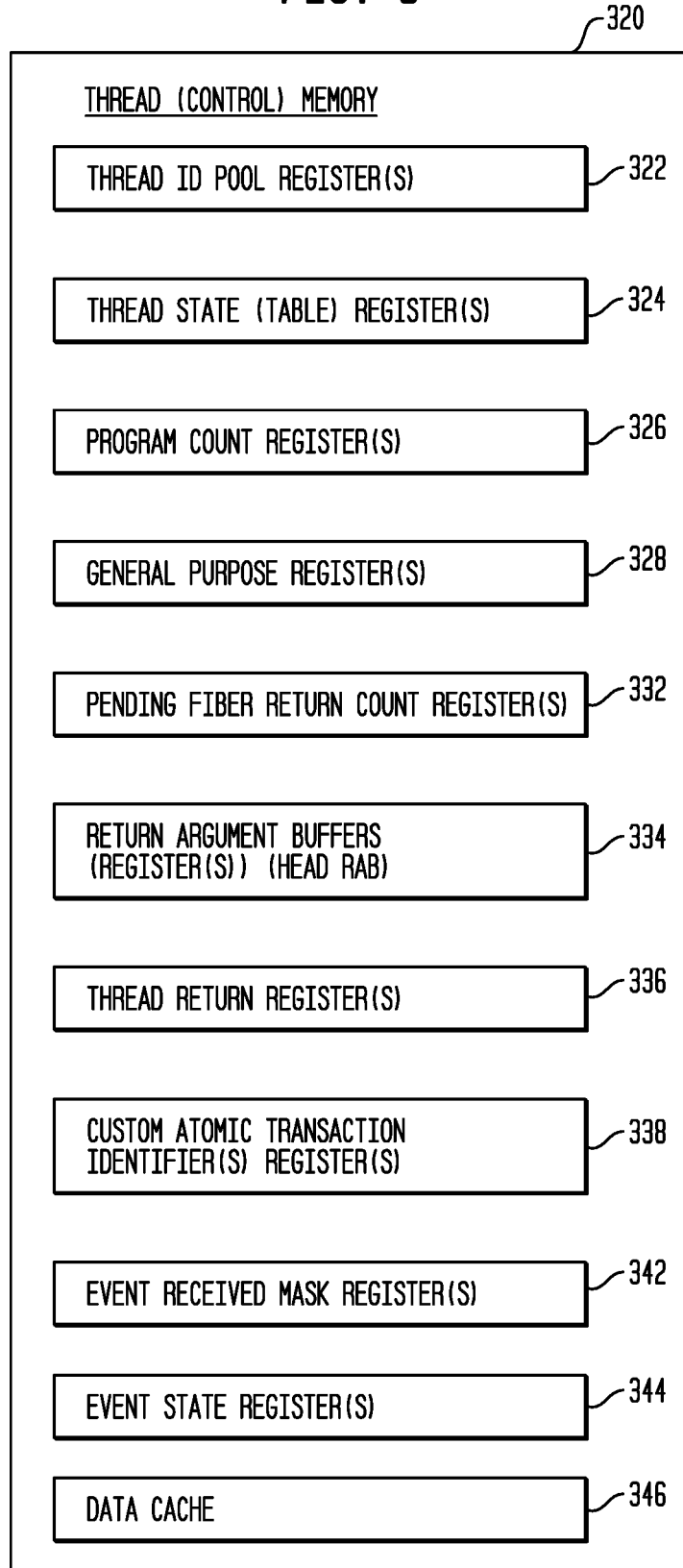
FIG. 6 is a detailed block diagram of a representative embodiment of a thread memory of the hybrid threading processor.
Figure 7:
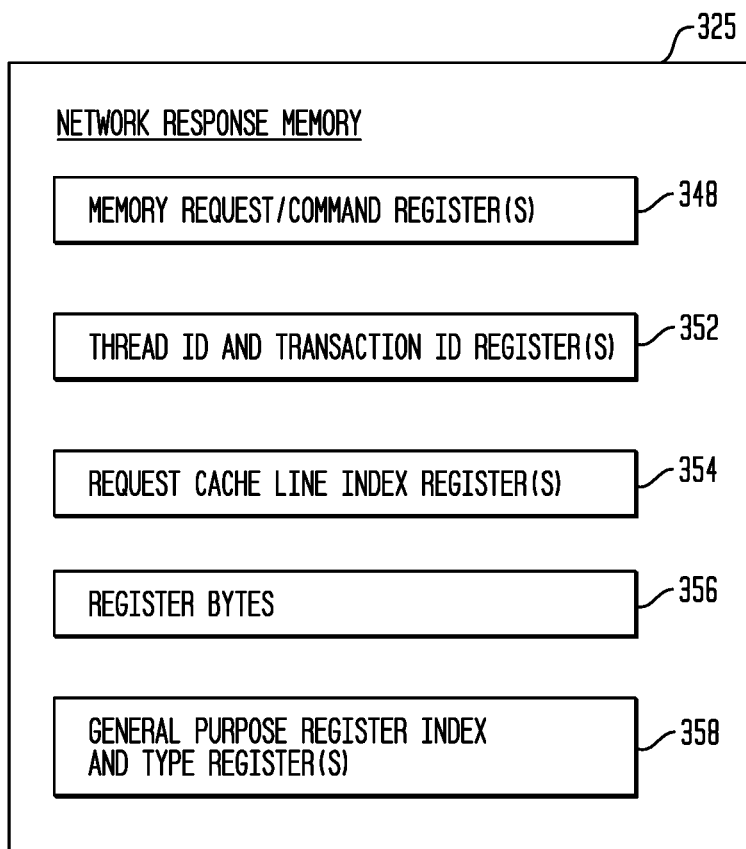
FIG. 7 is a detailed block diagram of a representative embodiment of a network response memory of the hybrid threading processor.
Figure 8:
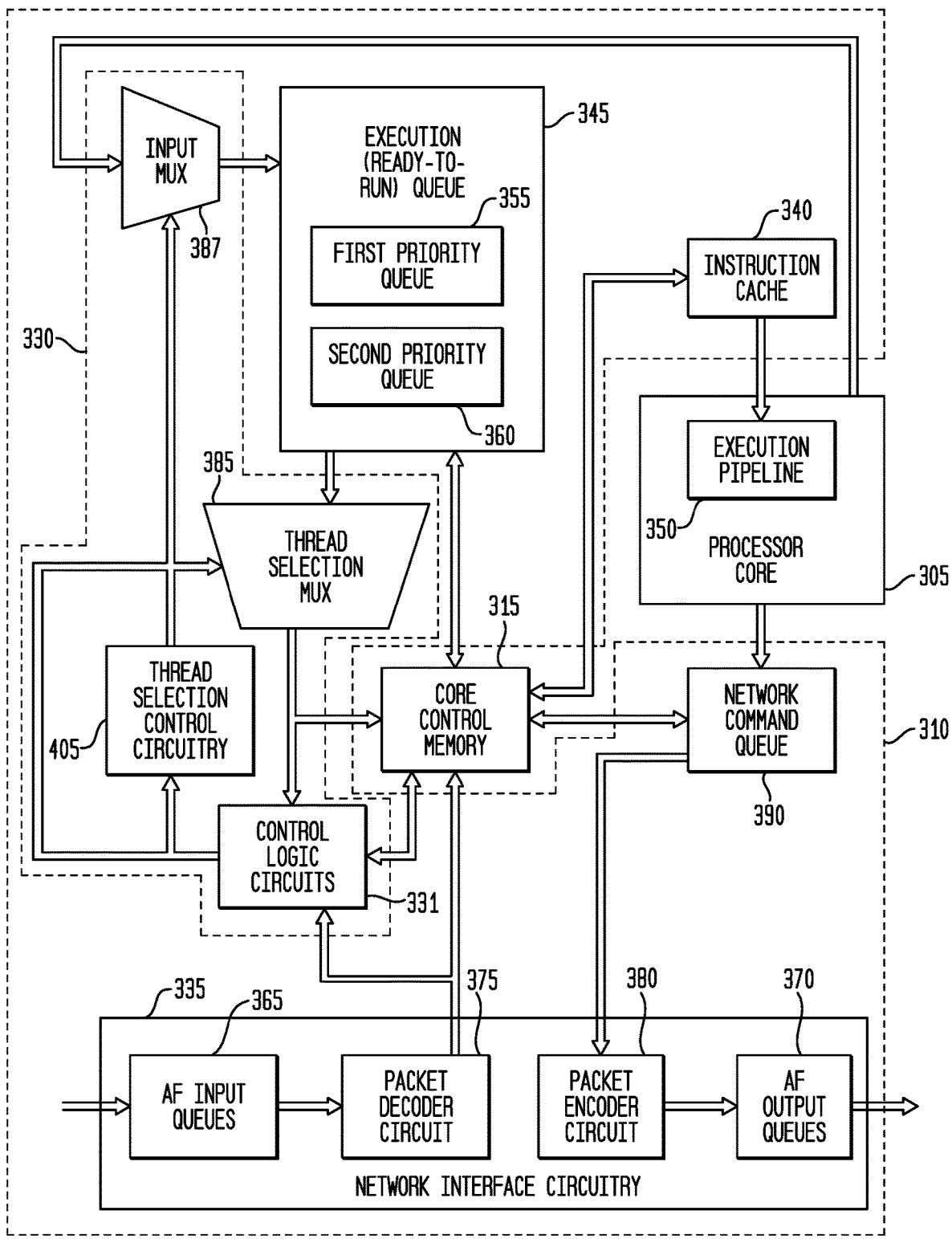
FIG. 8 is a detailed block diagram of a representative embodiment of a hybrid threading processor.
Figure 9A:
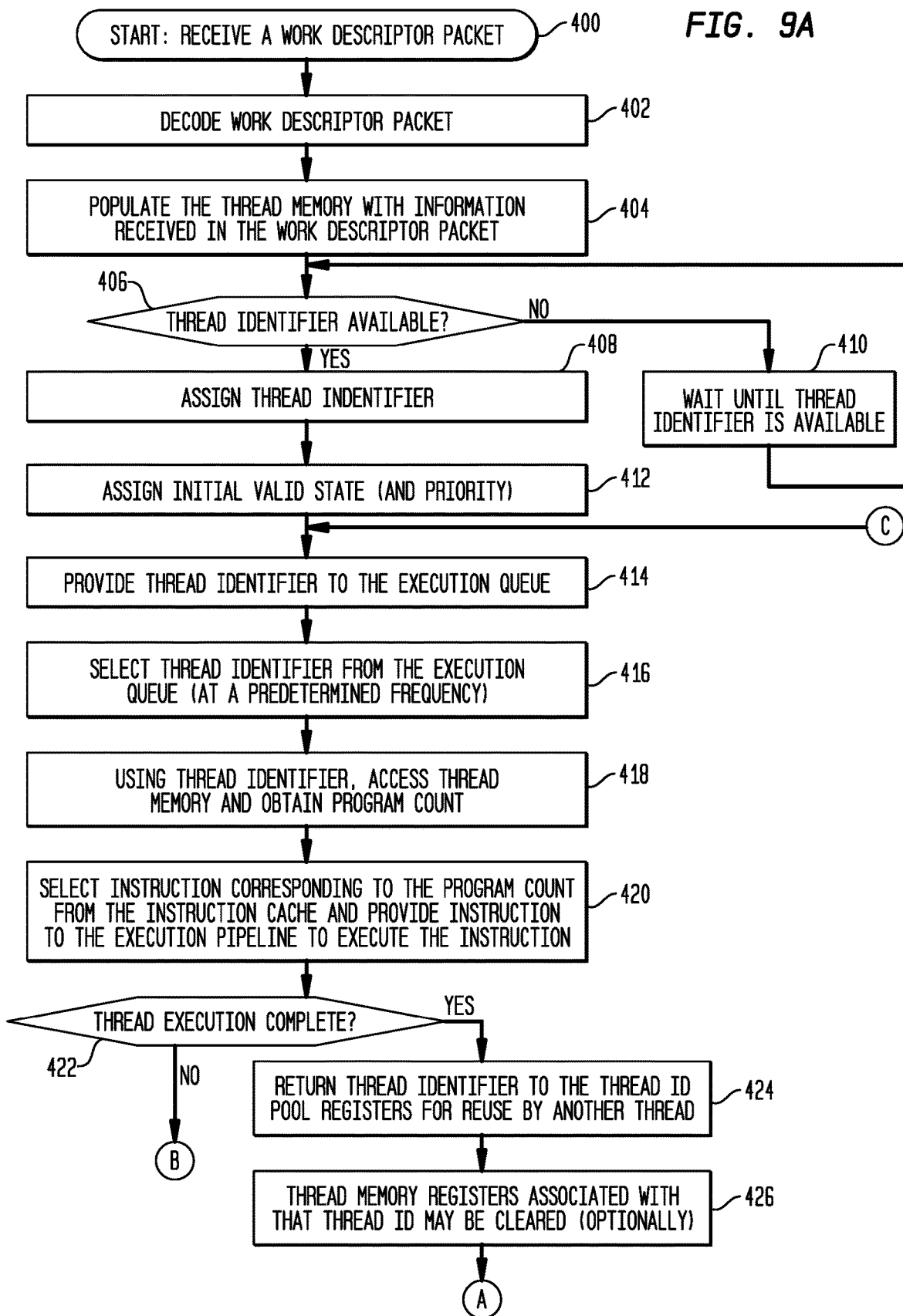
FIGS. 9A and 9B (collectively FIG. 9) are a flow chart of a representative embodiment of a method for self-scheduling and thread control for a hybrid threading processor.
Figure 9B:
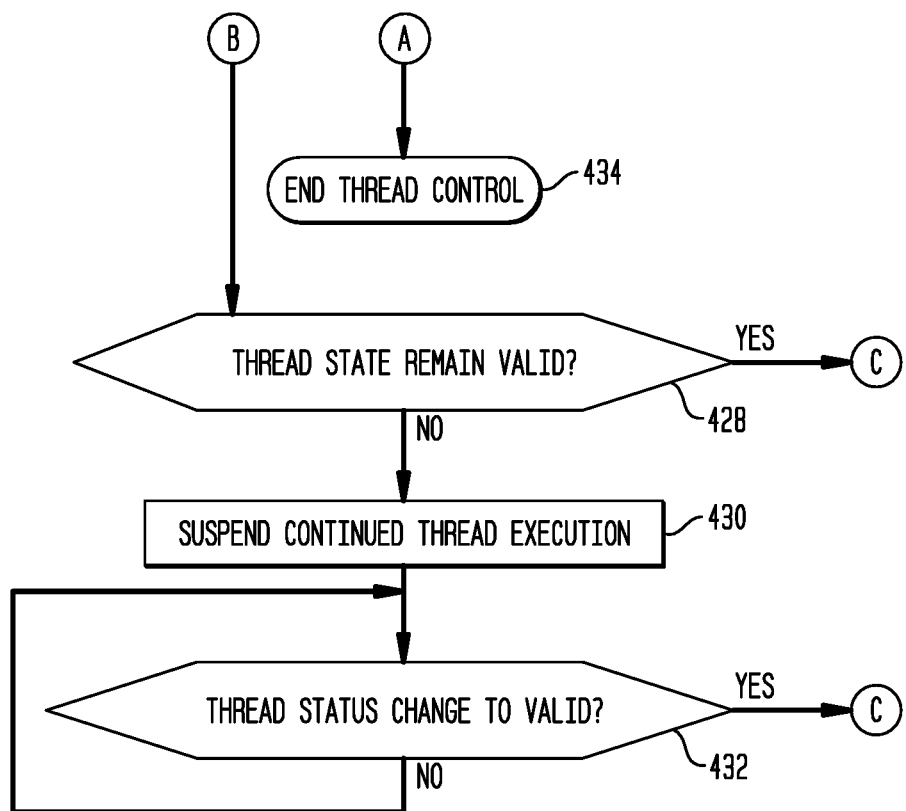

FIGS. 1, 2 and 3 are block diagrams of representative first, second, and third embodiments of a hybrid computing system 100A, 100B, 100C (collectively referred to as a system 100). FIG. 4 is a high-level block diagram of a portion of a representative embodiment of a hybrid threading fabric circuit cluster 205 with a second interconnection network 250. FIG. 5 is a high-level block diagram of a representative embodiment of a hybrid threading processor ("HTP") 300. FIG. 6 is a detailed block diagram of a representative embodiment of a thread memory 320 (also referred to equivalently as a thread control memory 320 or thread context memory 320) of the HTP 300. FIG. 7 is a detailed block diagram of a representative embodiment of a network response memory 325 of the HTP 300. FIG. 8 is a detailed block diagram of a representative embodiment of an HTP 300. FIG. 9 is a flow chart of a representative embodiment of a method for self-scheduling and thread control for an HTP 300.

Referring to FIGS. 1-9, a hybrid computing system 100 includes a hybrid threading processor ("HTP") 300, which is coupled through a first interconnection network 150 to one or more hybrid threading fabric ("HTF") circuits 200. It should be understood that term "fabric", as used herein, means and includes an array of computing circuits, which in this case are reconfigurable computing circuits. FIGS. 1, 2, and 3 show different system 100A, 100B, and 100C arrangements which include additional components forming comparatively larger and smaller systems 100, any and all of which are within the scope of the disclosure. As shown in FIGS. 1 and 2, which may each be an arrangement suitable for a system-on-a-chip ("SOC"), for example and without limitation, a hybrid computing system 100A, 100B, in various combinations as illustrated, may also include, optionally, a memory controller 120 which may be coupled to a memory 125 (which also may be a separate integrated circuit), any of various communication interfaces 130 (such as a PCIe communication interface), one or more host processor(s) 110, and a host interface ("HIF") 115. As shown in FIG. 3, which may each be an arrangement suitable for a "chiplet" configuration on a common substrate 101, for example and without limitation, a hybrid computing system 100C may also include, optionally, a communication interface 130, with or without these other components. Any and all of these arrangements are within the scope of the disclosure, and collectively are referred to herein as a system 100. Any of these hybrid computing systems 100 also may be considered a "node", operating under a single operating system ("OS"), and may be coupled to other such local and remote nodes as well.

Hybrid threading, as used herein, refers to the capability to spawn multiple fibers and threads of computation across different, heterogeneous types of processing circuits (hardware), such as across HTF circuits 200 (as a reconfigurable computing fabric) and across a processor, such as the HTP 300 or another type of RISC-V processor. Hybrid threading also refers to a programming language/style in which a thread of work transitions from one compute element to the next to move the compute to where the data is located, which is also implemented in representative embodiments. A host processor 110 is typically a multi-core processor, which may be embedded within the hybrid computing system 100, or which may be an external host processor coupled into the hybrid computing system 100 via a communication interface 130, such as a PCIe-based interface. These processors, such as the HTP 300 and the one or more host processor(s) 110, are described in greater detail below.

The memory controller 120 may be implemented as known or becomes known in the electronic arts. Alternatively, in a representative embodiment, the memory controller 120 may be implemented as described in the related applications. The first memory 125 also may be implemented as known or becomes known in the electronic arts, and as described in greater detail below.

Also in a representative embodiment, the HTP 300 is a RISC-V ISA based multi-threaded processor having one or more processor cores 305 having an extended instruction set, with one or more core control circuits 310 and one or more second memories 315, referred to as a core control memories 315, as discussed in greater detail below. Generally, the HTP 300 provides barrel-style, round-robin instantaneous thread switching to maintain a high instruction-per-clock rate.

The HIF 115, for the purposes herein, provides for a host processor 110 to send work to the HTP 300 and the HTF circuits 200, and for the HTP 300 to send work to the HTF circuits 200, both as "work descriptor packets" transmitted over the first interconnection network 150. A unified mechanism is provided to start and end work on an HTP 300 and an HTF circuit 200: call work descriptor packets are utilized to start work on an HTP 300 and an HTF circuit 200, and return work descriptor packets are utilized to end work on an HTP 300 and an HTF circuit 200. The HIF 115 includes a dispatch circuit and queue (abbreviated "dispatch queue" 105), which also provides management functionality for monitoring the load provided to and resource availability of the HTF circuits 200 and/or HTP 300. When resources are available on the HTF circuits 200 and/or HTP 300, the dispatch queue 105 determines the HTF circuit 200 and/or HTP 300 resource that is least loaded. In the case of multiple HTF circuit clusters 205 with the same or similar work loading, it chooses an HTF circuit cluster 205 that is currently executing the same kernel if possible (to avoid having to load or reload a kernel configuration). Similar functionality of the HIF 115 may also be included in an HTP 300, for example, particularly for system 100 arrangements which may not include a separate HIF 115. Other HIF 115 functions are described in greater detail below.

An HIF 115 may be implemented as known or becomes known in the electronic arts, e.g., as one or more state machines with registers (forming FIFOs, queues, etc.).

The first interconnection network 150 is a packet-based communication network providing data packet routing between and among the HTF circuits 200, the hybrid threading processor 300, and the other optional components such as the memory controller 120, a communication interface 130, and a host processor 110. The first interconnection network 150 is typically embodied as a plurality of crossbar switches having a folded clos configuration, and typically a mesh network for additional connections, depending upon the system 100 embodiment. For purposes of the present disclosure, the first interconnection network 150 forms part of an asynchronous switching fabric ("AF"), meaning that a data packet may be routed along any of various paths, such that the arrival of any selected data packet at an addressed destination may occur at any of a plurality of different times, depending upon the routing. This is in contrast with the synchronous mesh communication network of the second interconnection network 250 discussed in greater detail below. Aspects of the first interconnection network 150 are discussed in greater detail below with reference to FIGS. 10 and 11.

A HTF circuit 200, in turn, typically comprises a plurality of HTF circuit clusters 205, with each HTF circuit cluster 205 coupled to the first interconnection network 150 for data packet communication. Each HTF circuit cluster 205 may operate independently from each of the other HTF circuit clusters 205. Each HTF circuit cluster 205, in turn, comprises an array of a plurality of HTF reconfigurable computing circuits 210, which are referred to equivalently herein as "tiles" 210, and a second interconnection network 250. The tiles 210 are embedded in or otherwise coupled to the second interconnection network 250, which comprises two different types of networks, discussed in related applications. As an overview, the HTF circuit 200 is a coarse grained reconfigurable compute fabric comprised of interconnected compute tiles 210, for execution of a plurality of different compute operations.

The HTP 300 is a barrel style multi-threaded processor that is designed to perform well on applications with high degree of parallelism operating on sparse data sets (i.e., applications having minimal data reuse). The HTP 300 is based on the open source RISC-V processor, and executes in user mode. The HTP 300 includes more RISC-V user mode instructions, plus a set of custom instructions to allow thread management, sending and receiving events to/from other HTPs 300, HTF circuits 200 and one or more host processors 110, and instructions for efficient access to memory 125.

A processor core 305 has an associated cache memory, such as the data cache 346 illustrated as part of the core control memory 315, or which may be arranged internal to and/or contained within the processor core 305 (not separately illustrated). Such a cache 346 is typically utilized for storing data which will be reused, such that the data may be fetched from the cache and a memory load operation to the memory 125 is not required. Many applications, however, reuse very little data, and one or more memory load operations to the memory 125 are typically required for the application. As that data will not be reused, in representative embodiments, the data held in such a cache 346 associated with the processor core 305 will not be evicted or overwritten by the data fetched from the memory 125 during the memory load operation, as discussed in greater detail below, but will remain available in the cache for potential reuse.

As such, sparse data sets typically cause poor cache hit rates. The HTP 300 with many threads per HTP processor core 305 allows some threads to be waiting for response from memory 125 while other threads are continuing to execute instructions. This style of compute is tolerant of latency to memory 125 and allows high sustained executed instructions per clock. The event mechanism allows threads from many HTP cores 305 to communicate in an efficient manner. Threads pause executing an instruction while waiting for memory 125 responses or event messages, allowing other threads to use the instruction execution resources. The HTP 300 is self-scheduling and event driven, allowing threads to efficiently be created, destroyed and communicate with other threads.

Work descriptor packets are utilized to commence work on an HTP 300 and a HTF circuit 200. Receipt of a work descriptor packet by an HTP 300 constitutes an "event" which will trigger hardware-based self-scheduling and subsequent execution of the associated functions or work, referred to as threads of execution, in the HTP 300, without the need for further access to main memory 125. Once a thread is started it executes instructions until a thread return instruction is executed. The thread return instruction sends a return work descriptor packet to the original caller.

For purposes of the present disclosure, at a high or general level, a work descriptor packet includes the information needed to initialize a thread context for the HTP 300, such as a program count (e.g., as a 64-bit address) for where in the stored instructions (stored in instruction cache 340) to commence thread execution, and any arguments or addresses in first memory 125 to obtain arguments or other information which will be used in the thread execution, and a return address for transmission of computation results, for example and without limitation. There can be many different kinds of work descriptor packets, depending upon the operations or instructions to be performed, with many examples illustrated and discussed below. The instruction cache 340 has been populated in advance of any execution, such as in the initial system 100 configuration.

Accordingly, in many instances, the HTP 300 allows threads to be created and execution started without a single access to main memory 125. This "light weight" thread creation allows many threads to be created when an application's parallel region is entered with minimal delay and very low latency, in sharp contrast with prior art computing architectures, as thread creation is done by initializing a small (64B) work descriptor packet in hardware, then sending that packet to the destination HTP 300 where a thread is to be started. The receiving HTP 300 takes the packet and initialize a thread's hardware context from the work descriptor packet. The thread is immediately started executing instructions. As mentioned above, the work descriptor packet contains only the instruction PC where execution is to start and some number of call arguments (e.g., up to four). The receiving HTP 300 initializes the remainder of the thread context state autonomously in preparation for starting the thread executing instructions.

An executing thread has memory stack space and main memory 125 context space. The context space is only used if the state of the thread needs to be written to memory 125 to be accessed by the host processor 110. Each HTP 300 is initialized with a core stack base address and a core context base address, where the base addresses point a block of stacks and a block of context spaces. The thread stack base address is obtained by taking the core stack base address and adding the thread ID multiplied by the thread stack size. The thread context base address is obtained in a similar fashion.

An HTP 300 typically comprises one or more processor cores 305 which may be any type of processor core, such as a RISC-V processor core, an ARM processor core, etc., all for example and without limitation. A core control circuit 310 and a core control memory 315 are provided for each processor core 305, and are illustrated in FIG. 5 for one processor core 305. For example, when a plurality of processor cores 305 are implemented, such as in one or more HTPs 300, corresponding pluralities of core control circuits 310 and core control memories 315 are also implemented, with each core control circuit 310 and core control memory 315 utilized in the control of a corresponding processor core 305. In addition, one or more of the HTPs 300 may also include data path control circuitry 395, which is utilized to control access sizes (e.g., memory 125 load requests) over the first interconnection network 150 to manage potential congestion of the data path.

In turn, a core control circuit 310 comprises control logic and thread selection circuitry 330 and network interface circuitry 335. The core control memory 315 comprises a plurality of registers or other memory circuits, conceptually divided and referred to herein as thread memory (or thread control memory) 320 and network response memory 325. The thread memory 320 includes a plurality of registers to store information pertaining to thread state and execution, while the network response memory 325 includes a plurality of registers to store information pertaining to data packets transmitted to and from first memory 125 on the first interconnection network 150, such as requests to the first memory 125 for reading or storing data, for example and without limitation.

Referring to FIG. 6, the thread memory 320 includes a plurality of registers, including thread ID pool registers 322 (storing a predetermined number of thread IDs which can be utilized, and typically populated when the system 100 is configured, such as with identification numbers 0 to 31, for a total of 32 thread IDs, for example and without limitation); thread state (table) registers 324 (storing thread information such as valid, idle, paused, waiting for instruction(s), first (normal) priority, second (low) priority, temporary changes to priority if resources are unavailable); program counter registers 326 (e.g., storing an address or a virtual address for where the thread is commencing next in the instruction cache 340); general purpose registers 328 for storing integer and floating point data; pending fiber return count registers 332 (tracking the number of outstanding threads to be returned to complete execution); return argument buffers 334 ("RAB", such as a head RAB as the head of a link list with return argument buffers), thread return registers 336 (e.g., storing the return address, a call identifier, any thread identifier associated with the calling thread); custom atomic transaction identifier(s) registers 338; event received mask registers 342 (to designate which events to "listen" for, as discussed in greater detail below), event state registers 344, and a data cache 346 (typically providing 4-8 cache lines of cache memory for each thread). All of the various registers of the thread memory 320 are indexed using the assigned thread ID for a given or selected thread.

Referring to FIG. 7, the network response memory 325 includes a plurality of registers, such as memory request (or command) registers 348 (such as commands to read, write, or perform a custom atomic operation); thread ID and transaction identifiers ("transaction IDs") registers 352 (with transaction IDs utilized to track any requests to memory, and associating each such transaction ID with the thread ID for the thread which generated the request to memory 125); a request cache line index register 354 (to designate which cache line in the data cache 346 is to be written to when data is received from memory for a given thread (thread ID)); register bytes register 356 (designating the number of bytes to write to the general purpose registers 328); and a general purpose register index and type registers 358 (indicating which general purpose register 328 is to be written to, and whether it is sign extended or floating point).

As described in greater detail below, an HTP 300 will receive a work descriptor packet. In response, the HTP 300 will find an idle or empty context and initialize a context block, assigning a thread ID to that thread of execution (referred to herein generally as a "thread"), if a thread ID is available, and puts that thread ID in a an execution "ready-to-run") queue 345. Threads in the execution (ready-to-run) queue 345 are selected for execution, typically in a round-robin or "barrel" style selection process, with a single instruction for the first thread provided to the execution pipeline 350 of the processor core 305, followed by a single instruction for the second thread provided to the execution pipeline 350, followed by a single instruction for the third thread provided to the execution pipeline 350, followed by a single instruction for the next thread provided to the execution pipeline 350, and so on, until all threads in the execution (ready-to-run) queue 345 have had a corresponding instruction provided to the execution pipeline 350, at which point the thread selection commences again with a next instruction for the first thread in the execution (ready-to-run) queue 345 provided to the execution pipeline 350, followed by a next instruction for the second thread provided to the execution pipeline 350, and so on, cycling through all of the threads of the execution (ready-to-run)

queue 345. This execution will continue for each such thread until execution for that thread has been completed, such as by executing a thread return instruction, at which point a response packet (having the results of the thread execution) is transmitted back to the source of the work descriptor packet, i.e., back to the source of the work descriptor call packet. In addition, in a representative embodiment and as discussed in greater detail below, the execution (ready-to-run) queue 345 is optionally provided with different levels of priority, illustrated as a first priority queue 355 and a second (lower) priority queue 360, with execution of the threads in the first priority queue 355 occurring more frequently than the execution of the threads in the second (lower) priority queue 360.

As a result, the HTP 300 is an "event driven" processor, and will automatically commence thread execution upon receipt of a work descriptor packet (provided a thread ID is available, but without any other requirements for initiating execution), i.e., arrival of a work descriptor packet automatically triggers the start of thread execution locally, without any reference to or additional requests to memory 125. This is tremendously valuable, as the response time to commence execution of many threads in parallel, such as thousands of threads, is comparatively low. The HTP 300 will continue thread execution until thread execution is complete, or it is waiting for a response, at which point that thread will enter a "pause" state, as discussed in greater detail below. A number of different pause states are discussed in greater detail below. Following receipt of that response, the thread is returned to an active state, at which point the thread resumes execution with its thread ID returned to the execution (ready-to-run) queue 345. This control of thread execution is performed in hardware, by the control logic and thread selection circuitry 330, in conjunction with thread state information stored in the thread memory 320.

In addition to a host processor 110 generating work descriptor packets, an HTP 300 can also generate and transmit work descriptor packets to initiate work, as one or more compute threads, on another computing resource, such as another HTP 300 or any HTF circuit 200. Such a work descriptor packet is a "call" work descriptor packet, and generally comprises a source identifier or address for the host processor 110 or the HTP 300 which is generating the call work descriptor packet, a thread ID (such as a 16-bit call identifier (ID)) used to identify or correlate the return with the original call, a 64-bit virtual kernel address (as a program count, to locate the first instruction to begin execution of the thread, typically held in the instruction cache 340 of an HTP 300 (or of a HTF circuit 200), which also may be a virtual address space), and one or more call arguments, e.g., up to four call arguments).

Similarly, when the thread has been completed, the HTP 300 or HTF circuit 200 generates another work descriptor packet, referred to as a "return" work descriptor packet, which is generally created when the HTP 300 or HTF circuit 200 executes the last instruction of the thread, referred to as a return instruction, with the return work descriptor packet assembled by the packet encoder 380, discussed below. The return packet will be addressed back to the source (using the identifier or address provided in the call work descriptor packet), the thread ID (or call ID) from the call work descriptor packet (to allow the source to correlate the return with the issued call, especially when multiple calls have been generated by the source and are simultaneously outstanding), and one or more return values (as results), such as up to four return values.

FIG. 8 is a detailed block diagram of a representative embodiment of an HTP 300. For ease of illustration and discussion, it should be noted that not all registers of the thread memory 320 and the network response memory 325 are illustrated in FIG. 8. Referring to FIG. 8, the core control circuit 310 comprises control logic and thread selection circuitry 330 and network interface circuitry 335. The control logic and thread selection circuitry 330 comprises circuitry formed using combinations of any of a plurality of various logic gates (e.g., NAND, NOR, AND, OR, EXCLUSIVE OR, etc.) and various state machine circuits (control logic 331), and multiplexers (e.g., input multiplexer 387, thread selection multiplexer 385), for example and without limitation. The network interface circuitry 335 includes AF input queues 365 to receive data packets (including work descriptor packets) from the first interconnection network 150; AF output queues 370 to transfer data packets (including work descriptor packets) to the first interconnection network 150; a data packet decoder circuit 375 to decode incoming data packets from the first interconnection network 150, take data (in designated fields) and transfer the data provided in the packet to the relevant registers of the thread memory 320 and the network response memory 325 (in conjunction with the thread ID assigned to the thread by the control logic and thread selection circuitry 330, as discussed in greater detail below, which thread ID also provides or forms the index to the thread memory 320); and data packet encoder circuit 380 to encode outgoing data packets (such as requests to memory 125, using a transaction ID from thread ID and transaction identifiers ("transaction IDs") registers 352) for transmission on the first interconnection network 150. The data packet decoder circuit 375 and the data packet encoder circuit 380 may each be implemented as state machines or other logic circuitry.

When a work descriptor packet arrives, the control logic and thread selection circuitry 330 assigns an available thread ID to the thread of the word descriptor packet, from the thread ID pool registers 322, with the assigned thread ID used as an index to the other registers of the thread memory 320 which are then populated with corresponding data from the work descriptor packet, typically the program count and one or more arguments. The control logic and thread selection circuitry 330 initializes the remainder of the thread context state autonomously in preparation for starting the thread executing instructions, such as loading the data cache registers 346 and loading the thread return registers 336, for example and without limitation. Also for example, an executing thread has main memory stack space and main memory context space. The context space is only used if the state of the thread needs to be written to memory to be accessed by the host. Each HTP 300 processor core 305 is initialized with a core stack base address and a core context base address, where the base addresses point a block of stacks and a block of context spaces. The thread stack base address is obtained by taking the core stack base address and adding the thread ID multiplied by the thread stack size. The thread context base address is obtained in a similar fashion.

That thread ID is given a valid status (indicating it is ready to execute), and the thread ID is pushed to the first priority queue 355 of the execution (ready-to-run) queue(s) 345, as threads are typically assigned a first (or normal) priority. Selection circuitry of the control logic and thread selection circuitry 330, such as a multiplexer 385, selects the next thread ID in the execution (ready-to-run) queue(s) 345, which is used as an index into the thread memory 320 (the program count registers 326 and thread state registers 324), to select the instruction from the instruction cache 340 which is then provided to the execution pipeline 350 for execution. The execution pipeline then executes that instruction.

At completion of execution of the instruction, under the control of the control logic and thread selection circuitry 330 the same triplet of information (thread ID, valid state, and priority) can be returned to the execution (ready-to-run) queue(s) 345, for continued selection for round-robin execution, depending upon various conditions. For example, if the last instruction for a selected thread ID was a return instruction (indicating that thread execution was completed and a return data packet is being provided), the control logic and thread selection circuitry 330 will return the thread ID to the available pool of thread IDs in the thread ID pool registers 322, to be available for use by another, different thread. Also for example, the valid indicator could change, such as changing to a pause state (such as while the thread may be waiting for information to be returned from or written to memory 125 or waiting for another event), and in which case, the thread ID (now having a pause status) is not returned to the execution (ready-to-run) queue(s) 345 until the status changes back to valid.

Continuing with the former example, when the last instruction for a selected thread ID was a return instruction, the return information (thread ID and return arguments) is then pushed by the execution pipeline 350 to the network command queue 390, which is typically implemented as first-in, first out (FIFO). The thread ID is used as an index into the thread return registers 336 to obtain the return information, such as the transaction ID and the source (caller) address (or other identifier), and the packet encoder circuit 380 then generates an outgoing return data packet (on the first interconnection network 150).

Continuing with the latter example, an instruction of a thread may be a load instruction, i.e., a read request to the memory 125, which is then pushed by the execution pipeline 350 to the network command queue 390. The packet encoder circuit 380 then generates an outgoing data packet (on the first interconnection network 150) with the request to memory 125 (as either a read or a write request), including the size of the request and an assigned transaction ID (from the thread ID and transaction IDs registers 352, which is also used as an index into the network response memory 325), the address of the HTP 300 (as the return address of the requested information). When a packet is then received from the first interconnection network 150 and decoded, the transaction ID is used as an index into the network response memory 325, the thread ID of the thread which made the request is obtained, which also provides the location in the data cache 346 to write the data returned in the response, with the transaction ID then returned to the thread ID and transaction ID registers 352 to be reused, and the status of the corresponding thread ID is set again to valid and the thread ID is again pushed to the execution (ready-to-run) queue(s) 345, to resume execution.

A store request to memory 125 is executed similarly, with the outgoing packet also having the data to be written to memory 125, an assigned transaction ID, the source address of the HTP 300, and with the return packet being an acknowledgement with the transaction ID. The transaction ID is also then returned to the thread ID and transaction ID registers 352 to be reused, and the status of the corresponding thread ID is set again to valid and the thread ID is again pushed to the execution (ready-to-run) queue(s) 345, to resume execution.

FIG. 9 is a flow chart of a representative embodiment of a method for self-scheduling and thread control for an HTP 300, and provides a useful summary, with the HTP 300 having already been populated with instructions in the instruction cache 340 and a predetermined number of thread IDs in the thread identifier pool register 322. The method starts, step 400, upon reception of a work descriptor packet. The work descriptor packet is decoded, step 402, and the various registers of the thread memory 320 are populated with the information received in the work descriptor packet, initializing a context block, step 404. When a thread ID is available, step 406, a thread ID is assigned, step 408 (and if a thread ID is not available in step 406, the thread will wait until a thread ID becomes available, step 410). A valid status is initially assigned to the thread (along with any initially assigned priority, such as a first or second priority), step 412, and the thread ID is provided to the execution (ready-to-run) queue 345, step 414. A thread ID in the execution (ready-to-run) queue 345 is then selected for execution (at a predetermined frequency, discussed in greater detail below), step 416. Using the thread ID, the thread memory 320 is accessed, and a program count (or address) is obtained, step 418. The instruction corresponding to the program count (or address) is obtained from the instruction cache 340 and provided to the execution pipeline 350 for execution, step 420.

When the thread execution is complete, i.e., the instruction being executed is a return instruction, step 422, the thread ID is returned to the thread ID pool registers 322 for reuse by another thread, step 424, the thread memory 320 registers associated with that thread ID may be cleared (optionally), step 426, and the thread control may end for that thread, return step 434. When the thread execution is not complete in step 422, and when the thread state remains valid, step 428, the thread ID (with its valid state and priority) is returned to the execution (ready-to-run) queue 345, returning to step 414 for continued execution. When the thread state is no longer valid (i.e., the thread is paused) in step 428, with the paused status for that thread ID indicated in the thread memory 320, execution of that thread is suspended, step 430, until the status for that thread ID returns to valid, step 432, and the thread ID (with its valid state and priority) is returned to the execution (ready-to-run) queue 345, returning to step 414 for continued execution.

Similarly, the HTP 300 may generate calls, such as to create threads on local or remote compute elements, such as to create threads on other HTPs 300 or HTF circuits 200. Such calls are also created as outgoing data packets, and more specifically as outgoing work descriptor packets on the first interconnection network 150. For example, an instruction of a current thread being executed may be a "fiber create" instruction (stored as a possible instruction in the instruction cache 340), to spawn a plurality of threads for execution on the various compute resources. As discussed in greater detail below, such a fiber create instruction designates (using an address or virtual address (node identifier)) what computing resource(s) will execute the threads, and will also provide associated arguments. When the fiber create instruction is executed in the execution pipeline 350, the fiber create command is pushed into the network command queue 390, and the next instruction is executed in the execution pipeline 350. The command is pulled out of the network command queue 390, and the packet encoder 380 has the information needed to create and send a work descriptor packet to the specified destination HTF 200 or HTP 300.

If the created threads will have return arguments, then such an instruction will also allocate and reserve associated memory space, such as in the return argument buffers 334.

If there is insufficient space in the return argument buffers 334, the instruction will be paused until return argument buffers 334 are available. The number of fibers or threads created is only limited by the amount of space to hold the response arguments. Created threads that do not have return arguments can avoid reserving return argument space, avoiding the possible pause state. This mechanism ensures that returns from completed threads always have a place to store their arguments. As the returns come back to the HTP 300 as data packets on the first interconnection network 150, those packets are decoded, as discussed above, with the return data stored in the associated, reserved space in the return argument buffers 334 of the thread memory 320, as indexed by the thread ID associated with the fiber create instruction. As many registers could be utilized for the return argument, the return argument buffers 334 can be provided as a link list of all the spawned threads or return argument buffers or registers allocated for that thread ID. Significantly, this mechanism can allow potentially thousands of threads to be created very quickly, effectively minimizing the time involved in a transition from a single thread execution to high thread count parallelism.

As discussed in greater detail below, various types of fiber join instructions are utilized to determine when all of the spawned threads have completed, and can be an instruction with or without waiting. A count of the number of spawned threads is maintained in the pending fiber return count registers 332, which count is decremented as thread returns are received by the HTP 300. A join operation can be carried out by copying the returns into the registers associated with the spawning thread ID. If the join instruction is a waiting instruction, it will stay in a paused state until the return arrives which designates that thread ID of the spawning thread. In the interim, other instructions are executed by the execution pipeline 350 until the pause state of the join instruction changes to a valid state and the join instruction is returned to the execution (ready-to-run) queue 345.

A thread return instruction may also be utilized as the instruction following the fiber create instruction, instead of a join instruction. When the count in the pending fiber return count registers 332 reaches zero, with the receipt of the last thread return data packet, a thread return instruction may also be executed, and indicates that the fiber create operation has been completed and all returns received, allowing the thread ID, the return argument buffers 334, and link list to be freed for other uses. In addition, it may also generate and transmit a work descriptor return packet (e.g., having result data) to the source which called the main thread (e.g., to the identifier or address of the source which generated the call).

The join all instruction does not require that arguments be returned, only acknowledgements which decrement the count in the pending fiber return count registers 332. When that count reaches zero, that thread is restarted, as the join all is now complete.

Communication between processing elements is required to facilitate processing of parallel algorithms. The representative embodiments provide an efficient means for threads of a set of processing resources to communicate, using various event messages, which may also include data (such as arguments or results). The event messaging allows any host processors 110 with hardware maintained cache coherency and any acceleration processors (such as the HTP 300) with software maintained cache coherency to efficiently participate in event messaging.

The event messaging supports both point to point and broadcast event messages. Each processing resource (HTP 300) can determine when a received event operation has completed and the processing resource should be informed. The event receive modes include simple (a single received event completes the operation), collective (a counter is used to determine when sufficient events have been received to complete the operation), and broadcast (an event received on a specific channel completes the event). Additionally, events can be sent with an optional 64-bit data value.

The HTP 300 has a set of event receive states, stored in the event state registers 344, that consists of a 2-bit receive mode, a 16-bit counter/channel number, and a 64-bit event data value. An HTP 300 can have multiple sets of event receive states per thread context, where each set is indexed by an event number. Thus, an event can be targeted to a specific thread (thread ID) and event number. The sent event can be a point-to-point message with a single destination thread, or a broadcast message sent to all threads within a group of processing resources belonging to the same process. When such events are received, the paused or sleeping thread can be reactivated to resume processing.

This use of event state registers 344 is much more efficient than a standard Linux based host processor, which can send and receive events through an interface that allows the host processor 110 to periodically poll on completed receive events. Threads waiting on event messages can pause execution until the receive operation completes, i.e., the HTP 300 can pause execution of threads pending the completion of receive events, rather than waste resources by polling, allowing other threads to be executing during these intervals. Each HTP 300 also maintains a list of processing resources that should participate in receiving events to avoid process security issues.

A point-to-point message will specify an event number and the destination (e.g., node number, which HTP 300, which core, and which thread ID). On the receive side, an HTP 300 will have been configured or programmed with one or more event numbers held in the event state registers 344. If that HTP 300 receives an event message having that event number, it is triggered and transitions from a paused state to a valid state to resume execution, such as executing an event received instruction (e.g., EER, below). That instruction will then determine if the correct event number was received, and if so, write any associated 64-bit data into general purpose registers 328, for use by another instruction. If the event received instruction executes and the correct event number was not received, it will be paused until that specific event number is received.

An event listen (EEL) instruction may also be utilized, with an event mask stored in the event received mask registers 342, indicating one or more events which will be used to trigger or wake up the thread. When an event message with any of those designated events arrives, the receiving HTP 300 will know which event number was triggered, e.g., what other process may have been completed, and will receive event data from those completed events. The event listen instruction may also have waiting and a no waiting variations, as discussed in greater detail below.

For event messaging in a collective mode, the receiving HTP 300 will collect (wait for) a set of receive events before triggering, setting a count in the event state registers 344 to the value required, which is decremented as the required event messages are received, and triggering once the count has been decremented to zero.

In a broadcast mode, a sender processing resource can transmit a message to any thread within the node. For example, a sending HTP 300 may transmit a series of point-to-point messages to each other HTP 300 within the node, and each receiving HTP 300 will then pass the message to each internal core 305. Each core control circuit 310 will go through its thread list to determine if it corresponds to an event number which it has been initialized to receive, and upon which channel that may have been designated on the first interconnection network 150.

This broadcast mode is especially useful when thousands of threads may be executing in parallel, in which the last thread to execute transmits a broadcast event message indicating completion. For example, a first count of all threads requiring completion may be maintained in the event state registers 344, while a second count of all threads which have executed may be maintained in memory 125. As each thread executes, it also performs a fetch and increment atomic operation on the second count, such as through an atomic operation of the memory 125 (and compares it to the first count), and sets its mode to receive a broadcast message by executing an EER instruction to wait until it receives a broadcast message. The last one to execute will see the fetched value of the second count as the required first count minus one, indicating that it is the last thread to execute, and therefore sends the broadcast message, which is a very fast and efficient way to indicate completion of significant parallel processing.

As mentioned above, while the HTP 300 may utilize standard RISC-V instructions, a significantly extended set of instructions are provided to take advantage of all the system 100 compute resources, as discussed in greater detail below. Threads created from the host processor 110 are typically referred to as master threads, and threads created from the HTP 300 are typically referred to as fibers or fiber threads, and all are executed identically on the destination HTP 300 and HTF 200, without going through the memory 125.

Load Instructions:

The HTP 300 has a comparatively small number of read/write buffers per thread, also referred to as data cache registers 346. The buffers (data cache registers 346) temporarily store shared memory data for use by the owning thread. The data cache registers 346 are managed by a combination of hardware and software. Hardware automatically allocates buffers and evicts data when needed. Software, through the use of RISC-V instructions decides which data should be cached (read and write data), and when the data cache registers 346 should be invalidated (if clean) or written back to memory (if dirty). The RISC-V instruction set provides a FENCE instruction as well as acquire and release indicators on atomic instructions.

The standard RISC-V load instructions automatically use the read data cache registers 346. A standard load checks to see if the needed data is in an existing data cache register 346. If it is then the data is obtained from the data cache register 346 and the executing thread is able to continue execution without pausing. If the needed data is not in a data cache register 346, then the HTP 300 finds an available data cache register 346 (evicting data from a buffer needed), and reads 64 bytes from memory into the data cache register 346. The executing thread is paused until the memory read has completed and the load data is written into a RISC-V register.

Read buffering has two primary benefits: 1) larger accesses are more efficient for the memory controller 120, and 2) accesses to the buffer allow the executing thread to avoid stalling. However, there are situations when using the buffer causes problems. An example is a gather operation where accesses would typically cause thrashing of the data cache registers 346. For this reason, a set of special load instructions are provided to force a load instruction to check for a cache hit, but on a cache miss to issue a memory request for just the requested operand and not put the obtained data in a data cache register 346, and instead put the data into one of the general purpose registers 328.

These load instruction provides for "probabilistic" caching based upon anticipated frequency of access, for frequently used data versus sparsely or rarely used data. This is especially significant for use with sparse data sets, which if put into the data cache registers 346, would overwrite other data which will be needed again more frequently, effectively polluting the data cache registers 346. The load instruction (NB or NC) allows frequently used data to remain in the data cache registers 346, and less frequently used (sparse) data which would be typically cached to be designated instead for non-cached storage in the general purpose registers 328.

Instructions of this type have an NB suffix (non-buffered) (or equivalently, an NC suffice (non-cached)):

LB.NB RA,40(SP).

The NB (NC) load instructions are expected to be used in runtime libraries written in assembly.

The following load instructions were added as 32-bit instructions, where Imm is the immediate field, RA is a register name, rs1 is a source index, rd is a destination index, and the bits in fields 14-12 and 6-0 specify the instruction, in Table 1.

TABLE 1

| 31 20 | 19 15 | 14 12 | 11 7 | 6 0 | |
|---|---|---|---|---|---|
| Imm[11:0] | rs1 | 000 | rd | 0000010 | LB.NB |
| Imm[11:0] | rs1 | 001 | rd | 0000010 | LH.NB |
| Imm[11:0] | rs1 | 010 | rd | 0000010 | LW.NB |
| Imm[11:0] | rs1 | 011 | rd | 0000010 | LD.NB |
| Imm[11:0] | rs1 | 100 | rd | 0000010 | LBU.NB |
| Imm[11:0] | rs1 | 101 | rd | 0000010 | LHU.NB |
| Imm[11:0] | rs1 | 110 | rd | 0000110 | LWU.NB |
| Imm[11:0] | rs1 | 010 | rd | 0000110 | FLW.NB |
| Imm[11:0] | rs1 | 011 | rd | 0000110 | FLD.NB |

Bandwidth to memory is often the major contributor to limiting an application's performance. The representative embodiments provides a means to inform the HTP 300 as to how large of a memory load request should be issued to memory 125. The representative embodiments reduce wasted memory and bandwidth of the first interconnection network 150 due to access memory data that is not used by the application.

A further optimization exists where an application knows the size of a data structure being accessed and can specify the amount of data to be loaded into a data cache register 346. As an example, if an algorithm uses a structure that is 16 bytes in size, and the structures are scattered in memory, then it would be optimal to issue 16 byte memory reads and place the data into a data cache register 346. The representative embodiments define a set of memory load instructions that provide both the size of the operand to be loaded into an HTP 300 register, and the size of the access to memory if the load misses the data cache register 346. The actual load to memory 125 may be smaller than the instruction specified size if the memory access would cross a cache line boundary. In this case, the access size is reduced to ensure that the response data is written to a single cache line of the data cache registers 346.

When the requested data would be less than a cache line, the load instruction may also request additional data that the HTP 300 is currently unneeded but likely to be needed in the future, which is worth obtaining at the same time (e.g., as a pre-fetch), optimizing the read size access to memory 125.

This instruction can also override any reductions in access size which might have been utilized (as discussed in greater detail below with reference to FIG. 12) for bandwidth management.

The representative embodiments therefore minimize wasted bandwidth by only requesting memory data that is known to be needed. The result is an increase in application performance.

A set of load instructions have been defined that allow the amount of data to be accessed to be specified. The data is written into a buffer, and invalidated by an eviction, a FENCE, or an atomic with acquire specified. The load instructions provide hints as to how much additional data (in 8-byte increments) is to be accessed from memory and written to the memory buffer. The load will only access additional data to the next 64 byte boundary. A load instruction specifies the number of additional 8-byte elements to load using the operation suffix RB0-RB7:

LD.RB7 RA,40(SP)

The instruction formats are shown in Table 2. The number of 8-byte data elements to load into the buffer is specified as bits 6 and 4:3 of the 32-bit instruction. These load instructions can be used in assembly written routines, or ideally by a compiler. It is expected that initially only hand written assembly will take advantage of these instructions.

TABLE 2

| 31 20 | 19 15 | 14 12 | 11 7 | 6 0 | |
|---|---|---|---|---|---|
| Imm[11:0] | rs1 | 000 | rd | x0xx010 | LB.RC1-7 |
| Imm[11:0] | rs1 | 001 | rd | x0xx010 | LH.RC1-7 |
| Imm[11:0] | rs1 | 010 | rd | x0xx010 | LW.RC1-7 |
| Imm[11:0] | rs1 | 011 | rd | x0xx010 | LD.RC1-7 |
| Imm[11:0] | rs1 | 100 | rd | x0xx010 | LBU.RC1-7 |
| Imm[11:0] | rs1 | 101 | rd | x0xx010 | LHU.RC1-7 |
| Imm[11:0] | rs1 | 110 | rd | x0xx010 | LWU.RC1-7 |
| Imm[11:0] | rs1 | 010 | rd | x0xx110 | FLW.RC1-7 |
| Imm[11:0] | rs1 | 011 | rd | x0xx110 | FLD.RC1-7 |

Store Instructions

The HTP 300 has a small number of memory buffers that temporarily store shared memory data. The memory buffers allow multiple writes to memory to be consolidated into a smaller number of memory write requests. This has two benefits: 1) the fewer write requests is more efficient for the first interconnection network 150 and memory controllers 120, and 2) an HTP 300 suspends the thread that performs a memory store until the data is stored to either the HTP 300 memory buffer, or at the memory controller 120. Stores to the HTP 300 memory buffer are very quick and will typically not cause the thread to suspend execution. When a buffer is written to the memory controller 120, then the thread is suspended until a completion is received in order to ensure memory 125 consistency.

The standard RISC-V store instructions write data to the HTP 300 memory buffers. However, there are situations in which it is known that it is better to write the data directly to memory and not write to a memory buffer. One such situation is a scatter operation. A scatter operation would typically write just a single data value to the memory buffer. Writing to the buffer causes the buffers to thrash and other store data that would benefit from write coalescing is forced back to memory. A set of store instructions are defined for the HTP 300 to indicate that write buffering should not be used. These instructions write data directly to memory 125, causing the executing thread to be paused until the write completes.

The store no buffering instructions are expected to be used in hand assembled libraries and are indicated with a NB suffix:

ST.NB RA,40(SP)

The following store instructions were added as shown in Table 3.

TABLE 3

| 31 25 | 24 20 | 19 15 | 14 12 | 11 7 | 6 0 | |
|---|---|---|---|---|---|---|
| Imm[11:5] | rs2 | rs1 | 000 | Imm[4:0] | 0100010 | SB.NB |
| Imm[11:5] | rs2 | rs1 | 001 | Imm[4:0] | 0100010 | SH.NB |
| Imm[11:5] | rs2 | rs1 | 010 | Imm[4:0] | 0100010 | SW.NB |
| Imm[11:5] | rs2 | rs1 | 011 | Imm[4:0] | 0100010 | SD.NB |
| Imm[11:5] | rs2 | rs1 | 010 | Imm[4:0] | 0100110 | FSW.NB |
| Imm[11:5] | rs2 | rs1 | 011 | Imm[4:0] | 0100110 | FSD.NB |

Custom Atomic Store and Clear Lock (CL) Instructions:

Custom atomic operations set a lock on the provided address when the atomic operation is observed by the memory controller. The atomic operation is performed on an associated HTP 300. The HTP 300 should inform the memory controller when the lock should be cleared. This should be on the last store operation that the HTP 300 performs for the custom atomic operation (or on a fiber terminate instruction if no store is required). The HTP 300 indicates that the lock is to be cleared by executing a special store operation.

The following sequence of instructions could be used to implement a custom atomic DCAS operation.

```
// a0 - atomic address
// a1 - 64-bit memory value of a0
// a2 - DCAS compare value 1
// a3 - DCAS compare value 2
// a4 - DCAS swap value 1
// a5 - DCAS swap value 2
atomic_dcas:
    bne     a1, a2, fail    // first 8-byte compare
    ld.nb   a6, 8(a0)       // load second 8-byte memory value -
                               should hit memory cache
    bne     a6, a3, fail    // second 8-byte compare
    sd      a4, 0(a0)       // store first 8-byte swap value to thread
                               store buffer
    sd.cl   a5, 8(a0)       // store second 8-byte value and clear
                               memory lock
    eft     x0              // AMO success response
fail:
    li      a1, 1
    eft.cl  a1,(a0)         // AMO failure response (and clear memory
                               lock)
atomic_float_add:
    fadd.d  a2, a1, a2      // a1 contains memory value, a2 contains
                               value to be added in
    fsd.cl  a2, 0(a0)       // a0 contains memory address, clear lock
                               and terminate atomic
    eft                     // evict all line from buffer, terminate
                               atomic thread
```

The store instructions that indicate the lock should be cleared are:

SB.CL RA,40(SP)

SH.CL RA,40(SP)

SW.CL RA,40(SP)

SD.CL RA,40(SP)

FSW.CL RA,40(SP)

FSD.CL RA,40(SP)

The format for these store instructions is shown Table 4.

TABLE 4

| 31 25 | 24 20 | 19 15 | 14 12 | 11 7 | 6 0 | |
|---|---|---|---|---|---|---|
| Imm[11:5] | rs2 | rs1 | 000 | Imm[4:0] | 0110010 | SB.CL |
| Imm[11:5] | rs2 | rs1 | 001 | Imm[4:0] | 0110010 | SH.CL |
| Imm[11:5] | rs2 | rs1 | 010 | Imm[4:0] | 0110010 | SW.CL |
| Imm[11:5] | rs2 | rs1 | 011 | Imm[4:0] | 0110010 | SD.CL |
| Imm[11:5] | rs2 | rs1 | 010 | Imm[4:0] | 0110110 | FSW.CL |
| Imm[11:5] | rs2 | rs1 | 011 | Imm[4:0] | 0110110 | FSD.CL |

Fiber Create Instructions:

The Fiber Create ("EFC") instruction initiates a thread on an HTP 300 or HTF 200.

EFC.HTP.A4
EFC.HTF.A4

This instruction performs a call on an HTP 300 (or HTF 200), begins execution at the address in register a0. (Optionally, a suffix .DA may be utilized. The instruction suffix DA indicates that the target HTP 300 is determined by the virtual address in register a1. If the DA suffix is not present, then an HTP 300 on the local system 100 is targeted.) The suffix A1, A2 and A4 specifies the number of additional arguments to be passed to the HTP 300 or HTF 200. The argument count is limited to the values 0, 1, 2, or 4 (e.g., a packet should fit in 64B). The additional arguments are from register state (a2-a5).

It should be noted that if a return buffer is not available at the time the EFC instruction is executed, then the EFC instruction will wait until a return argument buffer is available to begin execution. Once the EFC instruction successfully creates a fiber, the thread continues at the instruction immediately following the EFC instruction.

It also should be noted that threads created by the host processor 110 are allowed to execute the EFC instruction and create fibers. Fibers created by an EFC instruction are not allowed to execute the EFC instruction and will force an exception, optionally. The format for these fiber create instructions is shown Table 5.

TABLE 5

| 31 25 | 24 20 | 19 15 | 14 12 | 11 7 | 6 0 | |
|---|---|---|---|---|---|---|
| 0000000 | 00000 | 00000 | ac | 00000 | 1110010 | EFC.HTP |
| 0001000 | 00000 | 00000 | ac | 00000 | 1110010 | EFC.HTP.DA |
| 0010000 | 00000 | 00000 | ac | 00000 | 1110010 | EFC.HTF |
| 0011000 | 00000 | 00000 | ac | 00000 | 1110010 | EFC.HTF.DA |

| ac Encoding | Suffix | Argument Count |
|---|---|---|
| 0 | No suffix | 0 |
| 1 | .A1 | 1 |
| 2 | .A2 | 2 |
| 3 | .A4 | 4 |

Thread Return Instructions:

The Thread Return (ETR) instruction passes arguments back to the parent thread that initiated the current thread (through a host processor 110 thread create or HTP 300 fiber create). Once the thread has completed the return instruction, the thread is terminated.

ETR.A2

This instruction performs a return to an HTP 300 or host processor 110. The ac suffix specifies the number of additional arguments to be passed to the HTP or host. Argument count can be the values 0, 1, 2 or 4. The arguments are from register state (a0-a3). The format for these thread return instructions is shown Table 6.

TABLE 6

| 31 25 | 24 20 | 19 15 | 14 12 | 11 7 | 6 0 | |
|---|---|---|---|---|---|---|
| 0100000 | 00000 | 00000 | ac | 00000 | 1110010 | EFR |

| ac Encoding | Suffix | Argument Count |
|---|---|---|
| 0 | No suffix | 0 |
| 1 | .A1 | 1 |
| 2 | .A2 | 2 |
| 3 | .A4 | 4 |

Fiber Join Instructions:

The Fiber Join (EFJ) instruction checks to see if a created fiber has returned. The instruction has two variants, join wait and non-wait. The wait variant will pause thread execution until a fiber has returned. The join non-wait does not pause thread execution but rather provides a success/failure status. For both variants, if the instruction is executed with no outstanding fiber returns then an exception is generated.

The arguments from the returning fiber (up to four) are written to registers a0-a3.

EFJ
EFJ.NW

The format for these fiber join instructions is shown Table 7.

TABLE 7

| 31 25 | 24 20 | 19 15 | 14 12 | 11 7 | 6 0 | |
|---|---|---|---|---|---|---|
| 0101000 | 00000 | 00000 | 000 | 00000 | 1110010 | EFJ |
| 0110000 | 00000 | 00000 | 000 | 00000 | 1110010 | EFJ.NW |

Fiber Join All Instructions:

The Fiber Join All instruction (EFJ.ALL) pends until all outstanding fibers have returned. The instruction can be called with zero or more pending fiber returns. No instruction status or exceptions are generated. Any returning arguments from the fiber returns are ignored.

EFJ.ALL

The format for these fiber join all instructions is shown Table 8.

TABLE 8

| 31 25 | 24 20 | 19 15 | 14 12 | 11 7 | 6 0 | |
|---|---|---|---|---|---|---|
| 0111000 | 00000 | 00000 | 000 | 00000 | 1110010 | EFJ.ALL |

Atomic Return Instructions:

The EMD atomic return instruction (EAR) is used to complete the executing thread of a custom atomic operation and possibly provide a response back to the source that issued the custom atomic request.

The EAR instruction can send zero, one, or two 8-byte arguments value back to the issuing compute element. The number of arguments to send back is determine by the ac2 suffix (A1 or A2). No suffix means zero arguments, A1 implies a single 8-byte argument, and A2 implies two 8-byte arguments. The arguments, if needed, are obtained from X registers a1 and a2.

The EAR instruction is also able to clear the memory line lock associated with the atomic instruction. The EAR uses the value in the a0 register as the address to send the clear lock operation. The clear lock operation is issued if the instruction contains the suffix CL.

The following DCAS example sends a success or failure back to the requesting processor using the EAR instruction.

```
// a0 - atomic address
// a1 - 64-bit memory value of a0
// a2 - DCAS compare value 1
// a3 - DCAS compare value 2
// a4 - DCAS swap value 1
// a5 - DCAS swap value 2
atomic_dcas:
    bne     a1, a2, fail  // first 8-byte compare
    ld.nb   a6, 8(a0)     // load second 8-byte memory value - should hit
                          memory
cache
    bne     a6, a3, fail  // second 8-byte compare
    sd      a4, 0(a0)     // store first 8-byte swap value to thread store
                          buffer
    sd.cl   a5, 8(a0)     // store second 8-byte value and clear memory
                          lock
    li      a1, 0
    ear.a1                // AMO success response
fail:
    li      a1, 1
    ear.cl.a1             // AMO failure response (and clear memory lock)
```

The instruction has two variants that allow the EFT instruction to also clear the memory lock associated with the atomic operation. The format for the supported instructions is shown in Table 9.

TABLE 9

| 31 | 25 | 24 | 20 | 19 | 15 | 14 | 12 | 11 | 7 | 6 | 0 | |
|---|---|---|---|---|---|---|---|---|---|---|---|---|
| 1010000 | | 00000 | | 00000 | | ac2 | | 00000 | | 1110010 | | EAR |
| 1011000 | | 00000 | | 00000 | | ac2 | | 00000 | | 1110010 | | EAR.CL |

TABLE 9-continued

| ac2 Encoding | Suffix | Argument Count |
|---|---|---|
| 0 | No suffix | 0 |
| 1 | .A1 | 1 |
| 2 | .A2 | 2 |

First and Second Priority Instructions:

The second (or low) priority instruction transitions the current thread having a first priority to a second, low priority. The instruction is generally used when a thread is polling on an event to occur (i.e. barrier).
  ELP
The format for the ELP instruction is shown Table 10.

TABLE 10

| 31 | 25 | 24 | 20 | 19 | 15 | 14 | 12 | 11 | 7 | 6 | 0 | |
|---|---|---|---|---|---|---|---|---|---|---|---|---|
| 1000000 | | 00000 | | 00000 | | 000 | | 00000 | | 1110010 | | ELP |

The first (or high) priority instruction transitions the current thread having a second (or low) priority to a first (or high or normal) priority. The instruction is generally used when a thread is polling and an event has occurred (i.e. barrier).
  ENP
The format for the ENP instruction is shown Table 11.

TABLE 11

| 31 | 25 | 24 | 20 | 19 | 15 | 14 | 12 | 11 | 7 | 6 | 0 | |
|---|---|---|---|---|---|---|---|---|---|---|---|---|
| 1001000 | | 00000 | | 00000 | | 000 | | 00000 | | 1110010 | | ENP |

Floating Point Atomic Memory Operations:

Floating point atomic memory operations are performed by the HTP 300 associated with a memory controller 120. The floating point operations performed are MIN, MAX and ADD, for both 32 and 64-bit data types.

The aq and rl bits in the instruction specify whether all write data is to be visible to other threads prior to issuing the atomic operation (aq), and whether all previously written data should be visible to this thread after the atomic completes (rl). Put another way, the aq bit forces all write buffers to be written back to memory, and the rl bit forces all read buffers to be invalidated. It should be noted that rs1 is an X register value, whereas rd and rs2 are F register values.
  AMOFADD.S rd, rs2, (rs1)
  AMOFMIN.S rd, rs2, (rs1)
  AMOFMAX.S rd, rs2, (rs1)
  AMOFADD.D rd, rs2, (rs1)
  AMOFMIN.D rd, rs2, (rs1)
  AMOFMAX.D rd, rs2, (rs1)
The format for these floating point atomic memory operation instructions is shown Table 12.

TABLE 12

| 31 | 27 | 26 | 25 | 24 | 20 | 19 | 15 | 14 | 12 | 11 | 7 | 6 | 0 | |
|---|---|---|---|---|---|---|---|---|---|---|---|---|---|---|
| 00000 | | aq | rl | rs2 | | rs1 | | 010 | | rd | | 0101110 | | AMOFADD.S |
| 00001 | | aq | rl | rs2 | | rs1 | | 010 | | rd | | 0101110 | | AMOFMIN.S |
| 00010 | | aq | rl | rs2 | | rs1 | | 010 | | rd | | 0101110 | | AMOFMAX.S |
| 00000 | | aq | rl | rs2 | | rs1 | | 011 | | rd | | 0101110 | | AMOFADD.D |
| 00001 | | aq | rl | rs2 | | rs1 | | 011 | | rd | | 0101110 | | AMOFMIN.D |
| 00010 | | aq | rl | rs2 | | rs1 | | 011 | | rd | | 0101110 | | AMOFMAX.D |

Custom Atomic Memory Operations:

Custom atomic operations are performed by the HTP 300 associated with a memory controller 120. The operation is performed by executing RISC-V instructions.

Up to 32 custom atomic operations can be available within the memory controllers 120 of a system 100. The custom atomics are a system wide resource, available to any process attached to the system 100.

The aq and rl bits in the instruction specify whether all write data is to be visible to other threads prior to issuing the atomic operation (rl), and whether all previously written data should be visible to this thread after the atomic completes (aq). Put another way, the rl bit forces all write buffers to be written back to memory, and the aq bit forces all read buffers to be invalidated.

The custom atomics use the a0 register to specify the memory address. The number of source arguments is provided by the suffix (A0, A1, A2 or A4), and are obtained from registers a1-a4. The number of result values returned from memory can be 0-2, and is defined by the custom memory operation. The result values are written to register a0-a1.

AMOCUSTO.A4

The following custom atomic instructions are defined as shown in Table 13.

TABLE 13

| 31 27 | 26 | 25 | 24 20 | 19 15 | 14 12 | 11 7 | 6 0 | |
|---|---|---|---|---|---|---|---|---|
| 10000 | aq | rl | 00000 | 00000 | ac | 00000 | 0101110 | AMOCUST0 |
| 10001 | aq | rl | 00000 | 00000 | ac | 00000 | 0101110 | AMOCUST1 |
| 10010 | aq | rl | 00000 | 00000 | ac | 00000 | 0101110 | AMOCUST2 |
| 10011 | aq | rl | 00000 | 00000 | ac | 00000 | 0101110 | AMOCUST3 |
| 10100 | aq | rl | 00000 | 00000 | ac | 00000 | 0101110 | AMOCUST4 |
| 10101 | aq | rl | 00000 | 00000 | ac | 00000 | 0101110 | AMOCUST5 |
| 10110 | aq | rl | 00000 | 00000 | ac | 00000 | 0101110 | AMOCUST6 |
| 10111 | aq | rl | 00000 | 00000 | ac | 00000 | 0101110 | AMOCUST7 |

The ac field is used to specify the number of arguments (0, 1, 2, or 4). The following Table 14 shows the encodings.

TABLE 14

| ac Encoding | Suffix | Argument Count |
|---|---|---|
| 0 | No suffix | 0 |
| 1 | .A1 | 1 |
| 2 | .A2 | 2 |
| 3 | .A4 | 4 |

There are eight custom atomic instructions defined, with 4 argument count variants each, resulting a total of 32 possible custom atomic operators.

Event Management:

The system 100 is an event driven architecture. Each thread has a set of events that is able to monitor, utilizing the event received mask registers 342 and the event state registers 344. Event 0 is reserved for a return from a created fiber (HTP 300 or HTF 200). The remainder of the events are available for event signaling, either thread-to-thread, broadcast, or collection. Thread-to-thread allows a thread to send an event to one specific destination thread on the same or a different node. Broadcast allows a thread to send a named event to a subset of threads on its node. The receiving thread should specify which named broadcast event it is expecting. Collection refers to the ability to specify the number of events that are to be received prior to the event becoming active.

An event triggered bit can be cleared (using the EEC instruction), and all events can be listened for (using the EEL instruction). The listen operation can either pause the thread until an event has triggered, or in non-waiting mode (NW) allowing a thread to periodically poll while other execution proceeds.

A thread is able to send an event to a specific thread using the event send instruction (EES), or broadcast an event to all threads within a node using the event broadcast instruction (EEB). Broadcasted events are named events where the sending thread specifies the event name (a 16-bit identifier), and the receiving threads filter received broadcast events for a pre-specified event identifier. Once received, the event should be explicitly cleared (EEC) to avoid receiving the same event again. It should be noted that all event triggered bits are clear when a thread starts execution.

Event Mode Instructions:

The event mode (EEM) instruction sets the operation mode for an event. Event 0 is reserved for thread return events, the remainder of the events can be in one of three receive modes: simple, broadcast, or collection.

In simple mode, a received event immediately causes the triggered bit to be set and increments the received message count by one. Each newly received event causes the received event count to be incremented. The receive event instruction (EER) causes the received event count to be decremented by one. The event triggered bit is cleared when the count transitions back to zero.

In broadcast mode, a received event's channel is compared to the event number's broadcast channel. If the channels match, then the event triggered bit is set. The EER instruction causes the triggered bit to be cleared.

In collection mode, a received event causes the event trigger count to be decremented by one. When the count reaches zero, then the event triggered bit is set. The EER instruction causes the triggered bit to be cleared.

The EEM instruction prepares the event number for the chosen mode of operation. In simple mode, the 16-bit event counter is set to zero. For broadcast mode, the 16-bit event channel number is set to the value specified by the EEM instruction. For collection mode, the 16-bit event counter is set to the value specified by the EEM instruction. Each of the three modes use the same 16-bit value differently.

| | | |
|---|---|---|
| EEM.BM | rs1, rs2 | ; rs1=event #, rs2=broadcast channel |
| EEM.CM | rs1, rs2 | ; rs1=event #, rs2=collection count |
| EEM.SM | rs1 | ; rs1=event # |

The format for the event mode instruction is shown Table 15.

TABLE 15

| 31 25 | 24 20 | 19 15 | 14 12 | 11 7 | 6 0 | |
|---|---|---|---|---|---|---|
| 0000100 | rs2 | rs1 | 000 | 00000 | 1110010 | EEM.BM |
| 0001100 | rs2 | rs1 | 000 | 00000 | 1110010 | EEM.CM |
| 0010100 | 00000 | rs1 | 000 | 00000 | 1110010 | EEM.SM |

Event Destination Instruction:

The event destination (EED) instruction provides an identifier for an event within the executing thread. The identifier is unique across all executing threads within a node. The identifier can be used with the event send instruction to send an event to the thread using the EES instruction. The identifier is an opaque value that contains the information needed to send the event from a source thread to a specific destination thread.

The identifier can also be used to obtain a unique value for sending a broadcast event. The identifier includes space for an event number. The input register rs1 specifies the event number to encode within the destination thread identifier. The output rd register contains the identifier after the instruction executes.

EED rd, rs1

The format for the event destination instruction is shown Table 16.

TABLE 16

| 31 25 | 24 20 | 19 15 | 14 12 | 11 7 | 6 0 | |
|---|---|---|---|---|---|---|
| 0011100 | 00000 | rs1 | 000 | rd | 1110010 | EED |

The event destination instruction can also be utilized by a process to obtain its own address, which can then be used in other broadcast messages, for example, to enable that process to receive other event messages as a destination, e.g., for receiving return messages when the process is a master thread.

Event Send Instructions:

The event send (EES) instruction sends an event to a specific thread. Register rs1 provides the destination thread and event number. Register rs2 provides the optional 8-byte event data.

EES rs1

EES.A1rs1, rs2

The rs2 register provides the target HTP 300 for the event send operation. Register rs1 provides the event number to be sent. Legal values for rs1 are 2-7. The format for the event send instruction is shown Table 17.

TABLE 17

| 31 25 | 24 20 | 19 15 | 14 12 | 11 7 | 6 0 | |
|---|---|---|---|---|---|---|
| 0100100 | 00000 | rs1 | 000 | 00000 | 1110010 | EES |
| 0101100 | rs2 | rs1 | 000 | 00000 | 1110010 | EES.A1 |

Event Broadcast Instructions:

The event broadcast (EEB) instruction broadcasts an event to all threads within the node. Register rs1 provides the broadcast channel to be sent (0-65535). Register rs2 provides optional 8-byte event data.

EEB rs1
EEB.A1 rs1, rs2

The format for the event broadcast instruction is shown Table 18.

TABLE 18

| 31 25 | 24 20 | 19 15 | 14 12 | 11 7 | 6 0 | |
|---|---|---|---|---|---|---|
| 0110100 | 00000 | rs1 | 000 | 00000 | 1110010 | EEB |
| 0111100 | rs2 | rs1 | 000 | 00000 | 1110010 | EEB.A1 |

Event Listen Instructions:

The event listen (EEL) instruction allows a thread to monitor the status of received events. The instruction can operate in one of two modes: waiting and non-waiting. The waiting mode will pause the thread until an event is received, the non-waiting mode provides the received events at the time the instruction is executed.

EEL rd, rs1
EEL.NW rd, rs1

Register rs1 provides a mask of available events as the output of the listen operation. The non-waiting mode will return a value of zero in rs1 if no events are available. The format for the event listen instructions is shown Table 19.

TABLE 19

| 31 25 | 24 20 | 19 15 | 14 12 | 11 7 | 6 0 | |
|---|---|---|---|---|---|---|
| 1000100 | 00000 | rs1 | 000 | rd | 1110010 | EEL |
| 1001100 | 00000 | rs1 | 000 | rd | 1110010 | EEL.NW |

Event Receive Instructions:

The event receive (EER) instruction is used to receive an event. Receiving an event includes acknowledging that an event was observed, and receiving the optional 8-byte event data. Register rs1 provides the event number. Register rd contains optional 8-byte event data.

EER rs1
EER.A1 rd, rs1

The format for the event receive instructions is shown Table 20.

TABLE 20

| 31 25 | 24 20 | 19 15 | 14 12 | 11 7 | 6 0 | |
|---|---|---|---|---|---|---|
| 1010100 | 00000 | rs1 | 000 | 00000 | 1110010 | EER |
| 1011100 | 00000 | rs1 | 000 | rd | 1110010 | EER.A1 |

Figure 10:
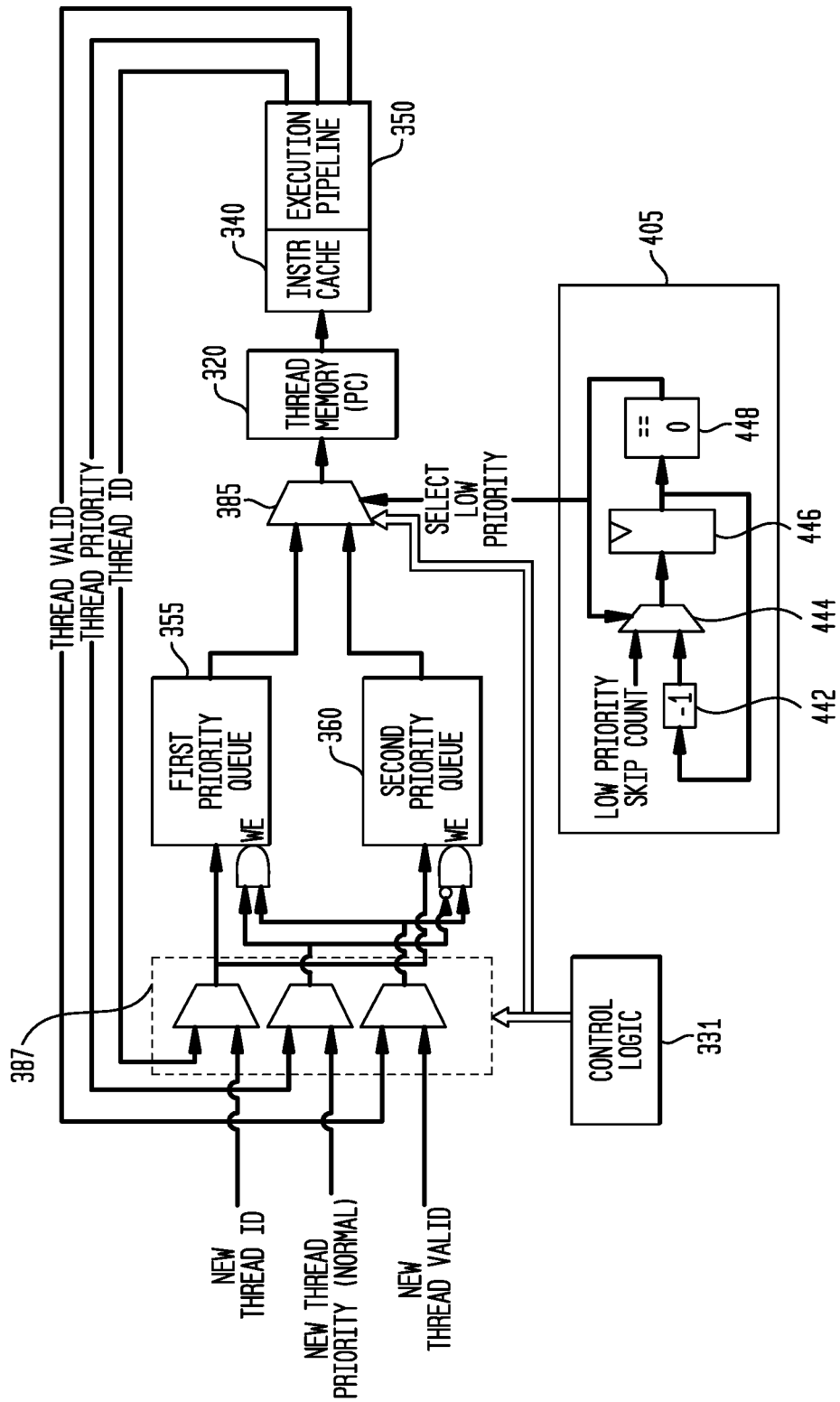
FIG. 10 is a detailed block diagram of a representative embodiment of a thread selection control circuitry of the control logic and thread selection circuitry of the hybrid threading processor.

FIG. 10 is a detailed block diagram of a representative embodiment of a thread selection control circuitry 405 of the control logic and thread selection circuitry 330 of the HTP 300. As mentioned above, a second or low priority queue 360 is provided, and thread IDs are selected from the first (or high) priority queue 355 or the second or low priority queue 360 using a thread selection multiplexer 385, under the control of the thread selection control circuitry 405. Threads in the second priority queue 360 are pulled from the queue and executed at a lower rate than threads in the first priority queue 360.

As mentioned above, a pair of instructions, ENP and ELP, are used to transition a thread from a first priority to second priority (ELP) and the second priority to the first priority (ENP).

Threads in a parallel application often must wait for other threads to complete priority to resuming execution (i.e., a barrier operation). The wait operation is completed through communication between the threads. This communication can be supported by an event that wakes a paused thread, or by the waiting thread polling on a memory location. When a thread is polling, it is wasting processing resources that could be used by the thread that must finish its work to allow all threads to resume productive execution. The second or low priority queue 360 allows the waiting threads to enter a low priority mode that will reduce the overhead of the polling threads. This serves to reduce the thread execution overhead of polling threads such that threads that must complete productive work consume the majority of the available processing resources.

A configuration register is used to determine the number of high priority threads that are to be run for each low priority thread, illustrated in FIG. 10 as the low priority "skip" count, provided to the thread selection control circuitry 405, which selects a thread from the second priority queue 360 at predetermined intervals. Stated another way, the thread selection multiplexer 385 will select, in succession, a predetermined number (i.e., the skip count) of threads from the first priority queue 355, "skipping" selection of any threads from the second or low priority queue 360.

Once that predetermined number of threads from the first priority queue 355 have been selected, the thread selection multiplexer 385 will then select a thread for execution from the second priority queue 360, i.e., a predetermined number of high priority threads are run for each low priority thread. As illustrated, thread selection control circuitry 405 decrements the skip count (register 442, multiplexer 444, and adder 446) until it is equal to zero (logic block 448), at which point the selection input of the thread selection multiplexer 385 toggles to select a thread from the second or low priority queue 360.

Accordingly, threads in the second priority queue 360 are pulled from the queue and executed at a lower rate than threads in the first priority queue 355. A configuration register (e.g., in thread memory 320) is used to determine the number of high priority threads that are to be run for each low priority thread. A pair of instructions, ENP and ELP, are used to transition a thread from first (or normal) priority to the second, low priority (ELP) and from the second, low priority to the first, normal priority (ENP).

Figure 11:
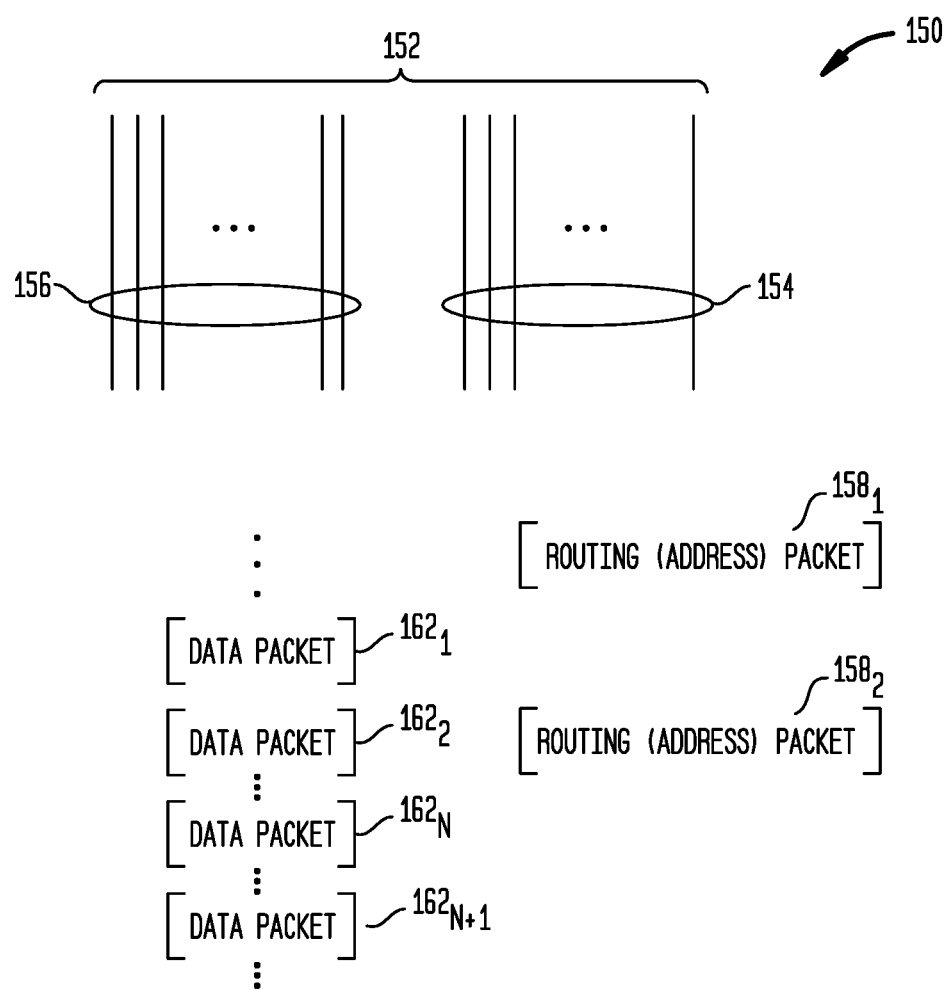
FIG. 11 is a block diagram of a representative embodiment of a portion of the first interconnection network and representative data packets.

FIG. 11 is a diagram of a representative embodiment of a portion of the first interconnection network 150 and representative data packets. In representative embodiment, the first interconnection network 150 includes a network bus structure 152 (a plurality of wires or lines), in which a first plurality of the network lines 154 are dedicated for addressing (or routing) data packets (158), and are utilized for setting the data path through the various crossbar switches, and the remaining second plurality of the network lines 156 are dedicated for transmission of data packets (the data load, illustrated as a train or sequence of "N" data packets $162_1$ through $162_N$) containing operand data, arguments, results, etc.) over the path established through the addressing lines (first plurality of the network lines 154). Two such network bus structures 152 are typically provided, into and out of each compute resource, as channels, a first channel for receiving data, and a second channel for transmitting data. A single, first addressing (or routing) data packet (illustrated as addressing (or routing) data packet $158_1$) may be utilized to establish the routing to a first designated destination, and may be followed (generally several clock cycles later, to allow for the setting of the switches) by one or more data packets 162 which are to be transmitted to the first designated destination, up to a predetermined number of data packets 162 (e.g., up to N data packets). While that predetermined number of data packets 162 are being routed, another, second addressing (or routing) data packet (illustrated as addressing (or routing) data packet $158_2$) may be transmitted and utilized to establish a routing to a second designated destination, for other, subsequent one or more data packets 162 which will be going to this second designated destination (illustrated as data packet $162_{N+1}$).

Figure 12:
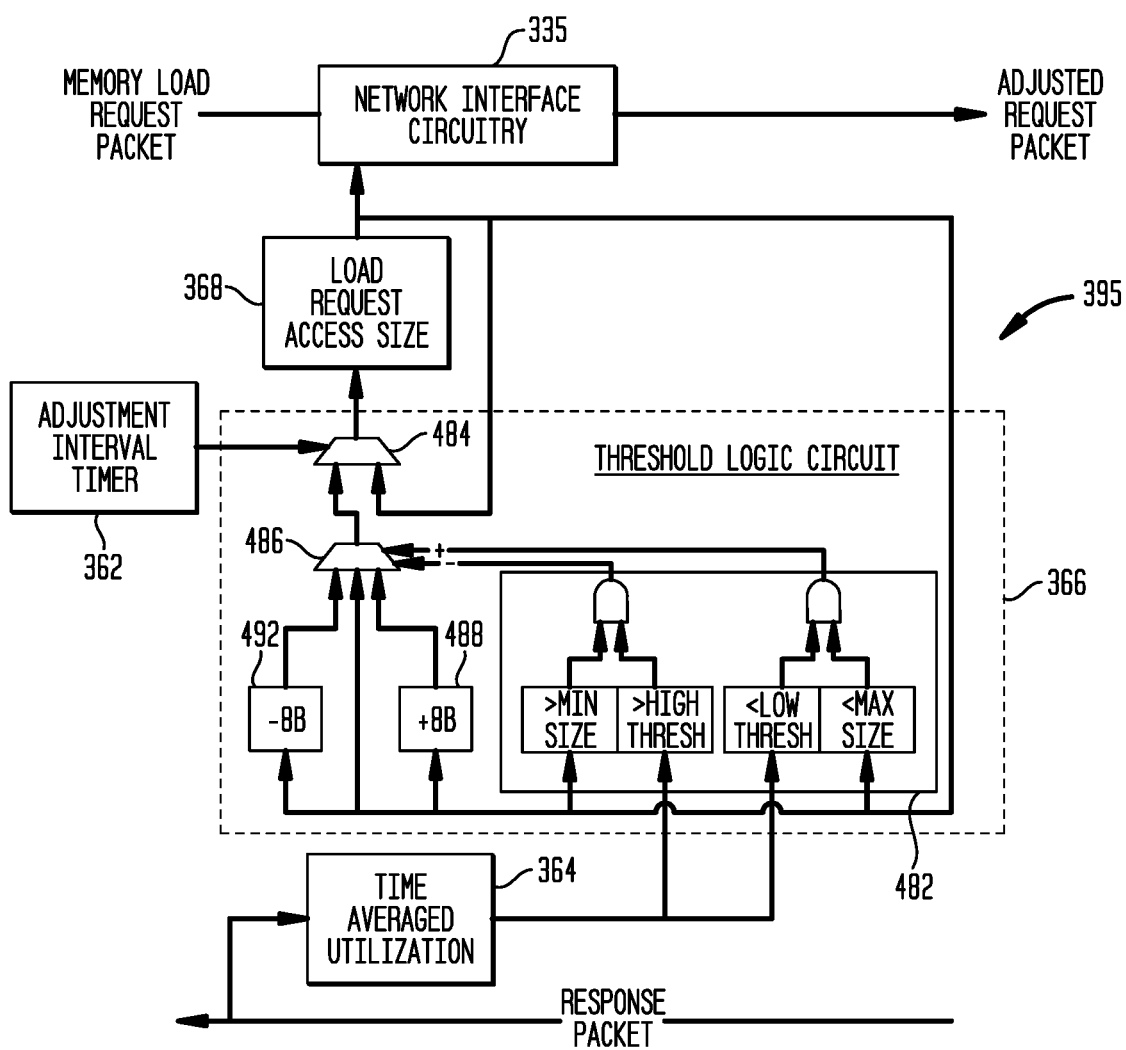
FIG. 12 is a detailed block diagram of a representative embodiment of data path control circuitry of a hybrid threading processor.

FIG. 12 is a detailed block diagram of a representative embodiment of data path control circuitry 395 of an HTP 300. As mentioned above, one or more of the HTPs 300 may also include data path control circuitry 395, which is utilized to control access sizes (e.g., memory 125 load requests) over the first interconnection network 150 to manage potential congestion, providing adaptive bandwidth.

Application performance is often limited by the bandwidth available to a processor from memory. The performance limitation can be mitigated by ensuring that only data that is needed by an application is brought into the HTP 300. The data path control circuitry 395 automatically (i.e., without user intervention) reduces the size of requests to main memory 125 to reduce the utilization of the processor interface and memory 125 subsystem.

As mentioned above, the compute resources of the system 100 may have many applications using sparse data sets, with frequent accesses to small pieces of data distributed throughout the data set. As a result, if a considerable amount of data is accessed, much of it may be unused, wasting bandwidth. For example, a cache line may be 64 bytes, but not all of it will be utilized. At other times, it will be beneficial to use all available bandwidth, such as for efficient power usage. The data path control circuitry 395 provides for dynamically adaptive bandwidth over the first interconnection network 150, adjusting the size of the data path load to optimize performance of any given application, such as adjusting the data path load down to 8-32 bytes (as examples) based upon the utilization of the receiving (e.g., response) channel of the first interconnection network 150 back to the HTP 300.

The data path control circuitry 395 monitors the utilization level on the first interconnection network 150 and reduces the size of memory 125 load (i.e., read) requests from the network interface circuitry 335 as the utilization increases. In a representative embodiment, the data path control circuitry 395 performs a time-averaged weighting (time averaged utilization block 364) of the utilization level of the response channel of the first interconnection network 150. If after a fixed period of time (adjustment interval timer 362) the utilization is above a threshold (and the load request size is greater than the minimum), using threshold logic circuit 366 (having a plurality of comparators 482 and selection multiplexers 484, 486), then the size of load requests is reduced by the load request access size logic circuit 368 (generally by a power of 2 (e.g., 8 bytes) from the threshold logic circuit 366, using minus increment 492), such that: either (a) fewer data packets 162 will be included in the train of data packets 162, allowing that bandwidth to be utilized for routing of data packets to another location or for another process; or (b) memory 125 utilization is more efficient (e.g., 64 bytes are not requested when only 16 bytes will be utilized). If after the fixed period of time the utilization is below a threshold (and the load request size is less than the maximum), using threshold logic circuit 366, then the size of the load request is increased by the load request access size logic circuit 368, generally also by a power of 2 (e.g., 8 bytes), using plus increment 488. The minimum and maximum values for the size of a load request can be user configured, however, the minimum size generally is the size of the issuing load instruction (e.g., the maximum operand size of the HTP 300, such as 8 bytes) and the maximum size is the cache line size (e.g., 32 or 64 bytes). In an alternative embodiment, the data path control circuitry 395 can be located at the memory controller 120, adapting to the bandwidth pressure from multiple HTPs 300.

Figure 13:
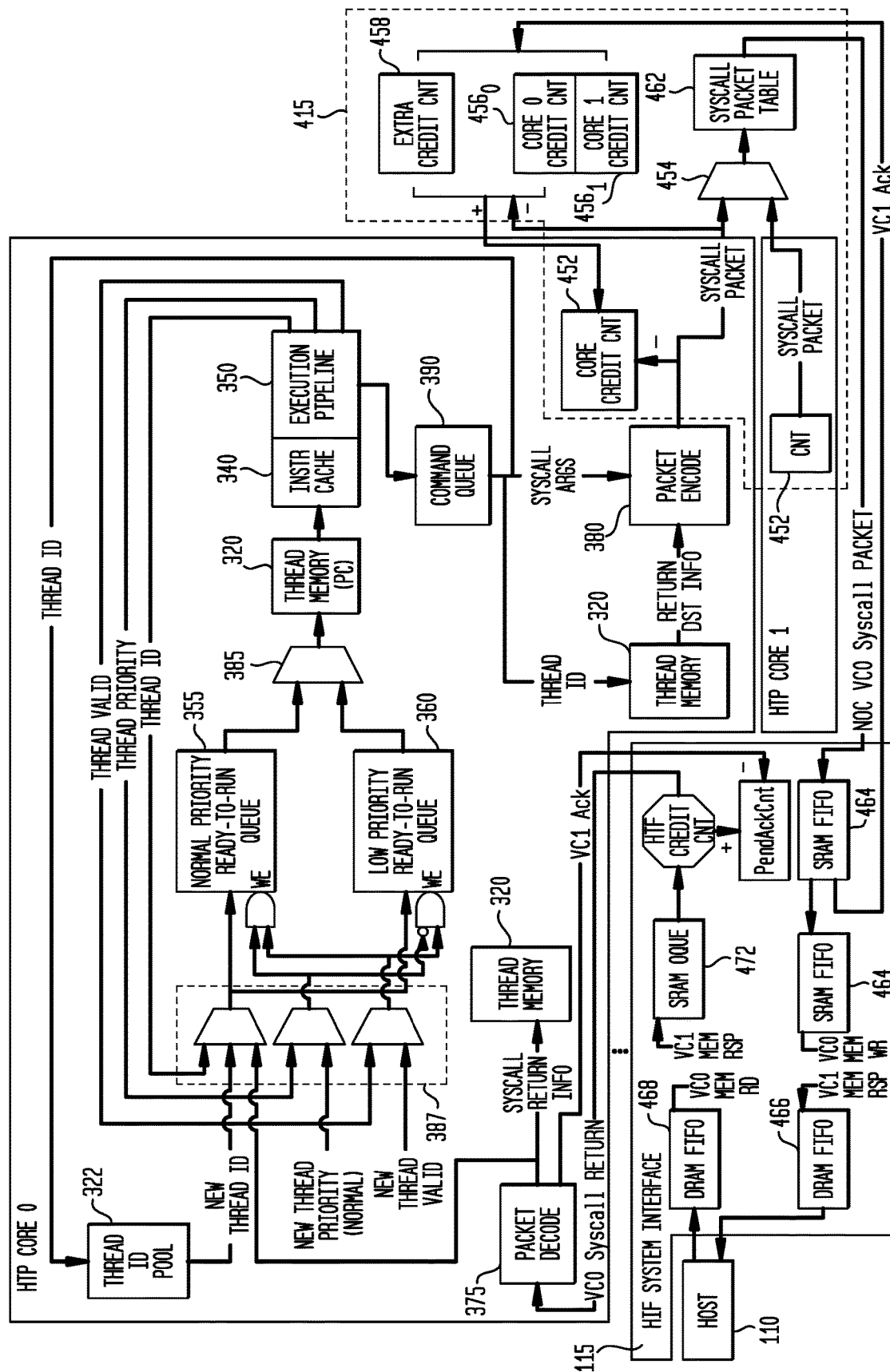
FIG. 13 is a detailed block diagram of a representative embodiment of system call circuitry of a hybrid threading processor and host interface circuitry.

FIG. 13 is a detailed block diagram of a representative embodiment of system call circuitry 415 of an HTP 300 and host interface circuitry 115. Representative system 100 embodiments allows a user mode only compute element, such as an HTP 300, to perform system calls, breakpoints and other privileged operations without running an operating system, such as to open a file, print, etc. To do so, any of these system operations are originated by an HTP 300 executing a user mode instruction. The processor's instruction execution identifies that the processor must forward the request to a host processor 110 for execution. The system request from the HTP 300 has the form of system call work descriptor packet sent to a host processor 110, and in response, the HTP 300 can receive system call return work descriptor packets.

The system call work descriptor packet, assembled and transmitted by the packet encoder 380, includes a system call identifier (e.g., a thread ID, the core 305 number, a virtual address indicated by the program counter, the system call arguments or parameters (which are typically stored in the general purpose registers 328), and return information. The packet is sent to a host interface 115 (SRAM FIFOs 464) that writes to and queues the system call work descriptor packets in a main memory queue, such as the illustrated DRAM FIFO 466 in host processor 110 main memory, increments a write pointer, and the host interface 115 further then sends an interrupt to the host processor 110 for the host processor 110 to poll for a system call work descriptor packet in memory. The host processor's operating system accesses the queue (DRAM FIFO 466) entries, performs the requested operation and places return work descriptor data in a main memory queue (DRAM FIFO 468), and also may signal the host interface 115. The host interface 115 monitors the state of the return queue (DRAM FIFO 468) and when an entry exists, moves the data into an output queue (SRAM output queue 472) and formats a return work descriptor packet with the work descriptor data provided and sends the return work descriptor packet to the HTP 300 which originated the system call packet.

The packet decoder 375 of the HTP 300 receives the return work descriptor packet and places the returned arguments in the general purpose registers 328 as if the local processor (HTP 300) performed the operation itself. This transparent execution as viewed by the application running on the user mode HTP 300 results in the ability to use the same programming environment and runtime libraries that are used when a processor has a local operating system, and is highly useful for a wide variety of situations, such as program debugging, using an inserted break point.

The host interface 115, however, typically has limited FIFO space, which could be problematic when multiple HTPs 300 are utilized, each having a large number of cores (e.g., 96), each of which may be running a large number of threads (e.g., 32/core). To avoid adding significant memory to the host interface 115, the overall number of system calls which can be submitted is limited, using a system call credit mechanism for each HTP 300 and each processor core 305 within an HTP 300.

Each processor core 305 includes a first register 452, as part of the system call circuitry 415, which maintains a first credit count. The system call circuitry 415, provided per HTP 300, includes a second register 458, which includes a second credit count, as a pool of available credits. When a system call work descriptor packet is generated, if there are sufficient credits available in the first register 452, the system call work descriptor packet may be selected (multiplexer 454) and transmitted, and if not, the system call work descriptor packet is queued in the system call work descriptor (system call) packet table 462, potentially with other system call work descriptor packet from other processor cores 305 of the given HTP 300. If there are sufficient credits available in the second register 458, providing an extra pool of credits for bursting of system calls and shared among all of the processor cores 305 of the HTP 300, the next system call work descriptor packet may be transmitted, and otherwise is held in the table.

As those system call work descriptor packets are processed by the host interface 115 and read out of the FIFO 464, the host interface 115 generates an acknowledgement back to the system call circuitry 415, which increments the credit counts per core in registers 456, which can in turn increment the first credit count in the first register 452, for each processor core 305.

Alternatively, registers 456 may be utilized equivalently to a first register 452, without requiring the separate first register 452 per core, and instead maintaining the first count in the registers 456, again per core 305. As another alternative, all of the system call work descriptor packets may be queued in the system call work descriptor packet table 462, on a per core 305 basis, and transmitted when that core has sufficient first credit counts in its corresponding register 456 or sufficient credits available in the second register 458.

A mechanism is also provided for thread state monitoring, to collect the state of the set of threads running on an HTP 300 in hardware, which allows a programmer to have the visibility into the workings of an application. With this feature, a host processor 110 can periodically access and store the information for later use in generating user profiling reports, for example. With the provided visibility, a programmer can make changes to the application to improve its performance.

All thread state changes can be monitored and statistics kept on the amount of time in each state. The processor (110 or 300) that is collecting the statistics provides a means for a separate, second processor (110 or 300) to access and store the data. The data is collected as the application is running such that a report can be provided to an application analyst that shows the amount of time in each state reported on a periodic basis, which provides detailed visibility on a running application for later use by an application analyst.

In accordance with the representative embodiments, which may be implemented in hardware or software, all of the information pertaining to a thread is stored in the various registers of the thread memory 320, and can be copied and saved in another location on a regular basis. A counter can be utilized to capture the amount of time any given thread spends in a selected state, e.g., a paused state. For example, the host processor 110 can log or capture the current state of all threads and thread counters (amount of time spent in a state), or the differences (delta) between states and counts over time, and write it to a file or otherwise save it in a memory. Also for example, a program or thread may be a barrier, in which all threads have to complete before anything else can start, and it is helpful to monitor which threads are in what state as they proceed through various barriers or as they change state. The illustrated code (below) is an example of simulator code which would execute as hardware or be translatable to hardware:

```
                InStateCount[N] - 6b
                InStateTimeStamp[N] - 64b
                InStateTotalTime[N] - 64b enum ESimR5State { eR5Idle=0, eR5Low=1, eR5Normal=2, eR5PausedMem=3, eR5PausedEar=4,
    eR5PausedEel=5, eR5PausedEer=6, eR5PausedEtr=7, eR5PausedEfj=8,
    eR5PausedEfjAll=9, eR5PausedSys=10, eR5PausedEes=11
};
// set state and collect statistics
void setR5CtxState(SimR5HwCtx * pR5Ctx, SimR5HwCtx::ESimR5State state) {
    m_coreStats.m_coreInStateTotalTime[pR5Ctx->m_r5State] +=
        (getSimTime( ) - m_coreStats.m_coreInStateTime[pR5Ctx->m_r5State]) *
        m_coreStats.m_coreInStateCount[pR5Ctx->m_r5State];
    m_coreStats.m_coreInStateTime[pR5Ctx->m_r5State] = getSimTime ( );
    m_coreStats.m_coreInStateTotalTime[state] +=
        (getSimTime ( ) - m_coreStats.m_coreInstateTime[state]) *
        m_coreStats.m_coreInStateCount[state];
    m_coreStats.m_coreInStateTime[state] = getSimTime ( );
    m_coreStats.m_coreInStateCount[pR5Ctx->m_r5State] -= 1;
    m_coreStats.m_coreInStateCount[state] += 1;
    pR5Ctx->m_r5State = state;
}
void incrementalStateStats(double incStateStats[HTP_R5_STATE_CNT]) {
    for (int state = 0; state < HTP_R5_STATE_CNT; state += 1) {
        m_coreStats.m_coreInStateTotalTime[state] +=
            (getSimTime ( ) - m_coreStats.m_coreInStateTime[state]) *
            m_coreStats.m_coreInStateCount[state];
        m_coreStats.m_coreInStateTime[state] = getSimTime ( );
        incStateStats[state] += m_coreStats.m_coreInStateTotalTime[state] -
            m_coreStats.m_coreInStatePrevTime[state];
        m_coreStats.m_coreInStatePrevTime[state] =
m_coreStats.m_coreInStateTotalTime[state];
    }
}
```

Numerous advantages of the representative embodiments are readily apparent. The representative apparatus, system and methods provide for a computing architecture capable of providing high performance and energy efficient solutions for compute-intensive kernels, such as for computation of Fast Fourier Transforms (FFTs) and finite impulse response (FIR) filters used in sensing, communication, and analytic applications, such as synthetic aperture radar, 5G base stations, and graph analytic applications such as graph clustering using spectral techniques, machine learning, 5G networking algorithms, and large stencil codes, for example and without limitation.

As used herein, a "processor core" may be any type of processor core, and may be embodied as one or more processor cores configured, designed, programmed or otherwise adapted to perform the functionality discussed herein. As used herein, a "processor" 110 may be any type of processor, and may be embodied as one or more processors configured, designed, programmed or otherwise adapted to perform the functionality discussed herein. As the term processor is used herein, a processor 110 or 300 may include use of a single integrated circuit ("IC"), or may include use of a plurality of integrated circuits or other components connected, arranged or grouped together, such as controllers, microprocessors, digital signal processors ("DSPs"), array processors, graphics or image processors, parallel processors, multiple core processors, custom ICs, application specific integrated circuits ("ASICs"), field programmable gate arrays ("FPGAs"), adaptive computing ICs, and associated memory (such as RAM, DRAM and ROM), and other ICs and components, whether analog or digital. As a consequence, as used herein, the term processor or controller should be understood to equivalently mean and include a single IC, or arrangement of custom ICs, ASICs, processors, microprocessors, controllers, FPGAs, adaptive computing ICs, or some other grouping of integrated circuits which perform the functions discussed herein, with associated memory, such as microprocessor memory or additional RAM, DRAM, SDRAM, SRAM, MRAM, ROM, FLASH, EPROM or $E^2$PROM. A processor 110 or 300, with associated memory, may be adapted or configured (via programming, FPGA interconnection, or hard-wiring) to perform the methodology of the invention, as discussed herein. For example, the methodology may be programmed and stored, in a processor 300 with its associated memory (and/or memory 125) and other equivalent components, as a set of program instructions or other code (or equivalent configuration or other program) for subsequent execution when the processor 110 or 300 is operative (i.e., powered on and functioning). Equivalently, when the processor 300 may be implemented in whole or part as FPGAs, custom ICs and/or ASICs, the FPGAs, custom ICs or ASICs also may be designed, configured and/or hard-wired to implement the methodology of the invention. For example, the processor 110 or 300 may be implemented as an arrangement of analog and/or digital circuits, controllers, microprocessors, DSPs and/or ASICs, collectively referred to as a "processor" or "controller", which are respectively hard-wired, programmed, designed, adapted or configured to implement the methodology of the invention, including possibly in conjunction with a memory 125.

The memory 125, which may include a data repository (or database), may be embodied in any number of forms, including within any computer or other machine-readable data storage medium, memory device or other storage or communication device for storage or communication of information, currently known or which becomes available in the future, including, but not limited to, a memory integrated circuit ("IC"), or memory portion of an integrated circuit (such as the resident memory within a processor or processor IC), whether volatile or non-volatile, whether removable or non-removable, including without limitation RAM, FLASH, DRAM, SDRAM, SRAM, MRAM, FeRAM, ROM, EPROM or E²PROM, or any other form of memory device, such as a magnetic hard drive, an optical drive, a magnetic disk or tape drive, a hard disk drive, other machine-readable storage or memory media such as a floppy disk, a CDROM, a CD-RW, digital versatile disk (DVD) or other optical memory, or any other type of memory, storage medium, or data storage apparatus or circuit, which is known or which becomes known, depending upon the selected embodiment. The memory 125 may be adapted to store various look up tables, parameters, coefficients, other information and data, programs or instructions (of the software of the present invention), and other types of tables such as database tables.

As indicated above, the processor 110 or 300 is hardwired or programmed, using software and data structures of the invention, for example, to perform the methodology of the present invention. As a consequence, the system and related methods of the present invention, including the various instructions, may be embodied as software which provides such programming or other instructions, such as a set of instructions and/or metadata embodied within a non-transitory computer readable medium, discussed above. In addition, metadata may also be utilized to define the various data structures of a look up table or a database. Such software may be in the form of source or object code, by way of example and without limitation. Source code further may be compiled into some form of instructions or object code (including assembly language instructions or configuration information). The software, source code or metadata of the present invention may be embodied as any type of code, such as C, C++, Matlab, SystemC, LISA, XML, Java, Brew, SQL and its variations (e.g., SQL 99 or proprietary versions of SQL), DB2, Oracle, or any other type of programming language which performs the functionality discussed herein, including various hardware definition or hardware modeling languages (e.g., Verilog, VHDL, RTL) and resulting database files (e.g., GDSII). As a consequence, a "construct", "program construct", "software construct" or "software", as used equivalently herein, means and refers to any programming language, of any kind, with any syntax or signatures, which provides or can be interpreted to provide the associated functionality or methodology specified (when instantiated or loaded into a processor or computer and executed, including the processor 300, for example).

The software, metadata, or other source code of the present invention and any resulting bit file (object code, database, or look up table) may be embodied within any tangible, non-transitory storage medium, such as any of the computer or other machine-readable data storage media, as computer-readable instructions, data structures, program modules or other data, such as discussed above with respect to the memory 125, e.g., a floppy disk, a CDROM, a CD-RW, a DVD, a magnetic hard drive, an optical drive, or any other type of data storage apparatus or medium, as mentioned above.

The present disclosure is to be considered as an exemplification of the principles of the invention and is not intended to limit the invention to the specific embodiments illustrated. In this respect, it is to be understood that the invention is not limited in its application to the details of construction and to the arrangements of components set forth above and below, illustrated in the drawings, or as described in the examples. Systems, methods and apparatuses consistent with the present invention are capable of other embodiments and of being practiced and carried out in various ways.

Although the invention has been described with respect to specific embodiments thereof, these embodiments are merely illustrative and not restrictive of the invention. In the description herein, numerous specific details are provided, such as examples of electronic components, electronic and structural connections, materials, and structural variations, to provide a thorough understanding of embodiments of the present invention. One skilled in the relevant art will recognize, however, that an embodiment of the invention can be practiced without one or more of the specific details, or with other apparatus, systems, assemblies, components, materials, parts, etc. In other instances, well-known structures, materials, or operations are not specifically shown or described in detail to avoid obscuring aspects of embodiments of the present invention. In addition, the various Figures are not drawn to scale and should not be regarded as limiting.

Reference throughout this specification to "one embodiment", "an embodiment", or a specific "embodiment" means that a particular feature, structure, or characteristic described in connection with the embodiment is included in at least one embodiment of the present invention and not necessarily in all embodiments, and further, are not necessarily referring to the same embodiment. Furthermore, the particular features, structures, or characteristics of any specific embodiment of the present invention may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated. In addition, every intervening sub-range within range is contemplated, in any combination, and is within the scope of the disclosure. For example, for the range of 5-10, the sub-ranges 5-6, 5-7, 5-8, 5-9, 6-7, 6-8, 6-9, 6-10, 7-8, 7-9, 7-10, 8-9, 8-10, and 9-10 are contemplated and within the scope of the disclosed range.

It will also be appreciated that one or more of the elements depicted in the Figures can also be implemented in a more separate or integrated manner, or even removed or rendered inoperable in certain cases, as may be useful in accordance with a particular application. Integrally formed combinations of components are also within the scope of the invention, particularly for embodiments in which a separation or combination of discrete components is unclear or indiscernible. In addition, use of the term "coupled" herein, including in its various forms such as "coupling" or "couplable", means and includes any direct or indirect electrical, structural or magnetic coupling, connection or attachment, or adaptation or capability for such a direct or indirect electrical, structural or magnetic coupling, connection or attachment, including integrally formed components and components which are coupled via or through another component.

With respect to signals, we refer herein to parameters that "represent" a given metric or are "representative" of a given metric, where a metric is a measure of a state of at least part of the regulator or its inputs or outputs. A parameter is considered to represent a metric if it is related to the metric directly enough that regulating the parameter will satisfactorily regulate the metric. A parameter may be considered to be an acceptable representation of a metric if it represents a multiple or fraction of the metric.

Furthermore, any signal arrows in the drawings/Figures should be considered only exemplary, and not limiting, unless otherwise specifically noted. Combinations of components of steps will also be considered within the scope of the present invention, particularly where the ability to separate or combine is unclear or foreseeable. The disjunctive term "or", as used herein and throughout the claims that follow, is generally intended to mean "and/or", having both conjunctive and disjunctive meanings (and is not confined to an "exclusive or" meaning), unless otherwise indicated. As used in the description herein and throughout the claims that follow, "a", "an", and "the" include plural references unless the context clearly dictates otherwise. Also as used in the description herein and throughout the claims that follow, the meaning of "in" includes "in" and "on" unless the context clearly dictates otherwise.

The foregoing description of illustrated embodiments of the present invention, including what is described in the summary or in the abstract, is not intended to be exhaustive or to limit the invention to the precise forms disclosed herein. From the foregoing, it will be observed that numerous variations, modifications and substitutions are intended and may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

It is claimed:

1. A processor coupled to an interconnection network in a system having a memory circuit, comprising:
    a processor core configured to execute a plurality of instructions; and
    a core control circuit coupled to the processor core, the core control circuit comprising:
    an interconnection network interface coupled to the interconnection network;
    a thread control memory comprising a plurality of registers, the plurality of registers comprising a thread identifier pool register storing a plurality of thread identifiers, a program count register storing a received program count, a data cache storing cached data, and a general-purpose register storing at least one received argument;
    an execution queue coupled to the thread control memory, the execution queue storing one or more thread identifiers, of the plurality of thread identifiers, having a valid status; and
    a control logic and thread selection circuit coupled to the execution queue, the control logic and thread selection circuit configured, in response to a work descriptor data packet having the received program count and the at least one received argument, to automatically assign a thread identifier of the plurality of thread identifiers to a corresponding execution thread of a plurality of execution threads, to automatically place the thread identifier in the execution queue, and to automatically and periodically select the thread identifier of the one or more thread identifiers in the execution queue for execution, by the processor core, of a single instruction of the corresponding execution thread, of the plurality of instructions, the processor core automatically commencing execution of the single instruction corresponding to the received program count using the at least one received argument stored in the general-purpose register; and
    data path control circuitry configured to control access size over the interconnection network.

2. The processor of claim 1, wherein the data path control circuitry is further configured to increase or decrease memory circuit load access size in response to time-averaged usage levels.

3. The processor of claim 1, wherein the data path control circuitry is further configured to increase or decrease memory circuit store access size in response to time-averaged usage levels.

4. The processor of claim 1, wherein the data path control circuitry comprises:
    a first multiplexer;
    a second multiplexer coupled to the first multiplexer;
    a plurality of comparators coupled to the first multiplexer;
    a time-averaged utilization logic circuit coupled to the plurality of comparators; and
    an adjustment interval timer circuit coupled to the second multiplexer.

5. The processor of claim 1, wherein the interconnection network interface is further configured to receive the work descriptor data packet, to decode the work descriptor data packet into the received program count and the at least one received argument for the corresponding execution thread, and to generate a return work descriptor packet for a selected execution thread of the plurality of execution threads in response to an execution of a return instruction by the processor core to complete execution of the selected execution thread.

6. The processor of claim 1, wherein the control logic and thread selection circuit is further configured to automatically and repeatedly select each thread identifier of the one or more thread identifiers in the execution queue for single instruction execution, by the processor core, of each corresponding execution thread of the plurality of execution threads.

7. The processor of claim 1, wherein the interconnection network interface is further configured to store the received program count and the at least one received argument in the thread control memory, using the thread identifier as an index to the thread control memory.

8. The processor of claim 1, wherein the interconnection network interface is further configured to generate and to receive a point-to-point event data message and a broadcast event data message.

9. The processor of claim 1, wherein the processor core is further configured to execute a fiber create instruction and wherein the core control circuit is further configured to generate and transmit one or more work descriptor data packets on the interconnection network to another circuit for execution of a corresponding plurality of execution threads, each work descriptor packet of the one or more work descriptor data packets having a program count and one or more arguments or memory addresses.

10. The processor of claim 9, wherein the control logic and thread selection circuit is further configured to reserve a predetermined amount of memory space in the thread control memory to store one or more return arguments.

11. The processor of claim 1, wherein the plurality of registers further comprise an event mask register, and wherein the control logic and thread selection circuit is further configured to determine an event number corresponding to a received event data packet and to use an event mask stored in the event mask register to respond to a received event data packet.

12. The processor of claim 1, wherein the core control circuit further comprises:
a network response memory;
an instruction cache coupled to the control logic and thread selection circuit; and
a network command queue storing one or more requests or return information for transmission by the interconnection network interface on the interconnection network.

13. The processor of claim 1, wherein the control logic and thread selection circuit is further configured to assign the valid status or a paused status to a selected thread identifier of the plurality of thread identifiers, and the control logic and thread selection circuit is further configured, when the selected thread identifier has the valid status, to return the selected thread identifier to the execution queue for periodic selection for single instruction execution by the processor core, and when the selected thread identifier has the paused status, to pause instruction execution by not returning the selected thread identifier to the execution queue.

14. The processor of claim 13, wherein the control logic and thread selection circuit is further configured to assign the paused status to the selected thread identifier when the processor core has executed a memory load instruction or a memory store instruction for an execution thread corresponding to the selected thread identifier.

15. The processor of claim 13, wherein the control logic and thread selection circuit is further configured to change the paused status to the valid status, for the selected thread identifier, in response to a received event data packet to resume execution of a single instruction of an execution thread corresponding to the selected thread identifier or in response to an event number of a received event data packet to resume execution of the execution thread corresponding to the selected thread identifier.

16. The processor of claim 1, wherein the thread control memory further comprises a register selected from the group consisting of: a thread state register; a pending fiber return count register; a return argument buffer or register; a return argument link list register; a custom atomic transaction identifier register; an event received mask register; an event state register; and combinations thereof.

17. The processor of claim 1, wherein the control logic and thread selection circuit is further configured to end execution of a selected execution thread and to return a corresponding thread identifier, of the plurality of thread identifiers, of the selected execution thread, to the thread identifier pool register in response to an execution of a return instruction by the processor core.

18. The processor of claim 17, wherein the control logic and thread selection circuit is further configured to clear the plurality of registers of the thread control memory indexed by the corresponding thread identifier, in response to the execution of the return instruction by the processor core.

19. The processor of claim 1, wherein the execution queue further comprises:
a first priority queue storing one or more thread identifiers, of the plurality of thread identifiers, for one or more first priority execution threads; and
a second priority queue storing one or more thread identifiers, of the plurality of thread identifiers, for one or more second priority execution threads.

20. The processor of claim 19, wherein the control logic and thread selection circuit further comprises:
thread selection control circuitry coupled to the execution queue, the thread selection control circuitry configured to select a first thread identifier, of the one or more thread identifiers for the one or more first priority execution threads, from the first priority queue at a first frequency, and to select a second thread identifier, of the one or more thread identifiers for the one or more second priority execution threads from the second priority queue at a second frequency for instruction execution by the processor core, the second frequency lower than the first frequency.

21. A processor coupled to an interconnection network in a system having a memory circuit, comprising:
a processor core configured to execute a plurality of instructions;
data path control circuitry configured to control access size to and from the memory circuit over the interconnection network in response to time-averaged usage levels; and
a core control circuit coupled to the processor core, the core control circuit comprising:
an interconnection network interface coupled to the interconnection network to receive a work descriptor data packet, the interconnection network interface configured to decode the received work descriptor data packet into an initial program count and a received argument for a corresponding execution thread;
a thread control memory coupled to the interconnection network interface and comprising a plurality of registers, the plurality of registers comprising a thread identifier pool register storing a plurality of thread identifiers, a thread state register, a program count register storing the initial program count, a data cache storing cached data, and a general-purpose register storing the received argument and non-cached data;
an execution queue coupled to the thread control memory, the execution queue storing one or more thread identifiers, of the plurality of thread identifiers, having a valid status;
an instruction cache coupled to the processor core to receive the initial program count and provide to the processor core a corresponding single instruction for execution, of the plurality of instructions;
a control logic and thread selection circuit coupled to the execution queue, to the instruction cache, and to the thread control memory, the control logic and thread selection circuit configured, in response to the received work descriptor data packet, to automatically assign a thread identifier, of the plurality of thread identifiers, to the corresponding execution thread and to automatically place the thread identifier in the execution queue, the control logic and thread selection circuit further configured to automatically select the thread identifier of the one or more thread identifiers in the execution queue and to access the thread control memory using the thread identifier as an index to select the initial program count for automatic execution by the processor core of a single instruction, of the plurality of instructions, corresponding to the initial program count, the processor core using the received argument for the corresponding execution thread, and the control logic and thread selection circuit further configured to automatically and periodically select the thread identifier of the one or more thread identifiers in the execution queue for single instruction execution, by the processor core, of the corresponding execution thread while the thread identifier is in the execution queue.

22. A processor coupled to an interconnection network in a system having a memory circuit, comprising:
- a processor core configured to execute a plurality of instructions; and
- a core control circuit coupled to the processor core, the core control circuit comprising:
- an interconnection network interface coupled to the interconnection network to receive a call work descriptor data packet, the interconnection network interface configured to decode the call work descriptor data packet into an initial program count and a received argument for a corresponding execution thread, to encode and transmit one or more a work descriptor packets on the interconnection network, and to receive one or more load response data packets;
- a thread control memory coupled to the interconnection network interface and comprising a plurality of registers, the plurality of registers comprising a thread identifier pool register storing a plurality of thread identifiers, a thread state register, a program count register storing the initial program count, and a general-purpose register storing the received argument and non-cached data;
- an execution queue coupled to the thread control memory, the execution queue comprising a first priority queue and a second priority queue, the first priority queue storing one or more thread identifiers for one or more first priority execution threads having a valid status, and the second priority queue storing one or more thread identifiers for one or more second priority execution threads having a valid status;
- a control logic and thread selection circuit coupled to the execution queue and to the thread control memory, the control logic and thread selection circuit configured, in response to the call work descriptor data packet, to automatically assign a thread identifier and an initial valid status to the corresponding execution thread, to automatically place the thread identifier in the first or second priority queue of the execution queue, to automatically and periodically select the thread identifier at a first frequency when the thread identifier is in the first priority queue and at a second frequency when the thread identifier is in the second priority queue, for execution by the processor core of a single instruction of the corresponding execution thread, the second frequency lower than the first frequency, with the processor core automatically commencing execution of the single instruction corresponding to the initial program count using the received argument, and the control logic and thread selection circuit further configured to pause execution of the corresponding execution thread when a memory request has been generated by not returning the thread identifier to the execution queue;
- an instruction cache coupled to the control logic and thread selection circuit to receive the initial program count and provide the single instruction for execution by the processor core;
- a network command queue storing one or more commands for generation of the one or more work descriptor packets;
- a network response memory coupled to the interconnection network interface, the network response memory comprising one or more memory request registers and one or more transaction identifier registers storing a plurality of transaction identifiers, each transaction identifier of the plurality of transaction identifiers associated with a selected thread identifier, of the plurality of thread identifiers, of a corresponding execution thread which generated a memory request; and
- data path control circuitry configured to increase or decrease memory circuit load access size over the interconnection network in response to time-averaged usage levels of the interconnection network and to increase or decrease memory circuit store access size over the interconnection network in response to time-averaged usage levels of the interconnection network.

\* \* \* \* \*